US012005410B2

(12) United States Patent
Schlueter

(10) Patent No.: US 12,005,410 B2
(45) Date of Patent: Jun. 11, 2024

(54) AGITATION ASSEMBLIES FOR A SPREADER

(71) Applicant: THE TORO COMPANY, Bloomington, MN (US)

(72) Inventor: Matthew Schlueter, Kingsford, MI (US)

(73) Assignee: THE TORO COMPANY, Bloomington, MN (US)

( * ) Notice: Subject to any disclaimer, the term of this patent is extended or adjusted under 35 U.S.C. 154(b) by 398 days.

(21) Appl. No.: 16/875,807

(22) Filed: May 15, 2020

(65) Prior Publication Data

US 2020/0360878 A1 Nov. 19, 2020

Related U.S. Application Data

(60) Provisional application No. 62/849,690, filed on May 17, 2019.

(51) Int. Cl.

*B01F 11/00* (2006.01)
*B01F 7/08* (2006.01)
*B01F 15/00* (2006.01)
*B01F 15/02* (2006.01)
*B01F 27/72* (2022.01)

(Continued)

(52) U.S. Cl.

CPC .............. *B01F 31/70* (2022.01); *B01F 27/72* (2022.01); *B01F 35/31* (2022.01); *B01F 35/3202* (2022.01); *B01F 35/55* (2022.01); *B01F 35/71731* (2022.01); *B01F 35/71775* (2022.01)

(58) Field of Classification Search

CPC .......... B01F 27/72; B01F 31/70; B01F 35/31; B01F 35/3202; B01F 35/55; B01F 35/71731; B01F 35/71775; E01C 19/2025; A01C 15/007; E01H 10/007

See application file for complete search history.

(56) References Cited

U.S. PATENT DOCUMENTS

| | | | |
|---|---|---|---|
| 2,858,011 | A | 10/1958 | Wahl |
| 2,967,056 | A | 1/1961 | D'Amato |

(Continued)

FOREIGN PATENT DOCUMENTS

| | | | |
|---|---|---|---|
| DE | 29517612 | U1 | 1/1996 |
| EP | 0102681 | B1 | 8/1987 |
| JP | H06343337 | A | * 12/1994 |

OTHER PUBLICATIONS

Google machine translation for "JPH06343337A" (Year: 1994).*

(Continued)

*Primary Examiner* — Elizabeth Insler

(74) *Attorney, Agent, or Firm* — MARSHALL, GERSTEIN & BORUN LLP

(57) ABSTRACT

Agitation assemblies for a spreader having a rotatable feeding mechanism are provided that utilize the rotation of the feeding mechanism to oscillate an agitation member within the spreader. A crank is coupled to the feeding mechanism and a connecting linkage connects between the agitation member and the crank so that as a drive mechanism rotates the feeding mechanism to dispense spreading material towards a dispensing opening, the connecting linkage oscillates the agitation member. The agitation member can be a baffle or agitation plate. The oscillation of the agitation member can be pivoting or sliding oscillation.

15 Claims, 24 Drawing Sheets

(51) Int. Cl.

| | |
|---|---|
| ***B01F 31/00*** | (2022.01) |
| ***B01F 35/00*** | (2022.01) |
| ***B01F 35/31*** | (2022.01) |
| ***B01F 35/32*** | (2022.01) |
| ***B01F 35/71*** | (2022.01) |

(56) References Cited

U.S. PATENT DOCUMENTS

| | | | | |
|---|---|---|---|---|
| 3,220,740 | A | 11/1965 | Kavan et al. | |
| 3,236,527 | A * | 2/1966 | Snyder | A01M 9/0069 239/668 |
| 3,322,429 | A * | 5/1967 | Cervelli | B60P 1/42 222/626 |
| 3,438,585 | A | 4/1969 | Buchmann | |
| 3,501,132 | A * | 3/1970 | Van Der Lely | A01C 3/06 366/285 |
| 3,878,815 | A | 4/1975 | Gorius | |
| 4,132,941 | A | 1/1979 | Sousek et al. | |
| 4,373,668 | A | 2/1983 | Forbes et al. | |
| 4,393,609 | A | 7/1983 | Persson | |
| 4,779,528 | A | 10/1988 | Bruke | |
| 4,922,768 | A | 5/1990 | Bruke | |
| 4,961,864 | A | 10/1990 | Bruke | |
| 4,984,477 | A | 1/1991 | Bruke | |
| D323,414 | S | 1/1992 | Bruke | |
| 5,085,372 | A * | 2/1992 | Martin | A01C 3/063 239/662 |
| D326,944 | S | 6/1992 | Bruke | |
| 5,368,153 | A | 11/1994 | Bruke | |
| 5,562,029 | A | 10/1996 | Bruke | |
| 5,765,966 | A | 6/1998 | White et al. | |
| 5,857,405 | A | 1/1999 | Bischof | |
| 5,875,882 | A | 3/1999 | Pollock | |
| 5,910,243 | A | 6/1999 | Bruke | |
| 5,988,535 | A * | 11/1999 | Kime | E01H 10/007 239/650 |
| 6,173,917 | B1 | 1/2001 | Whitell | |
| 6,422,490 | B1 * | 7/2002 | Truan | A01C 15/18 239/677 |
| 6,808,354 | B1 | 10/2004 | Kulbeth | |
| 2003/0161709 | A1 * | 8/2003 | Musso, Jr. | B60P 1/36 414/528 |
| 2012/0247927 | A1 | 10/2012 | Marchesini | |

OTHER PUBLICATIONS

SnowEx, “Not Your Standard V-Box”. Retrieved from the Internet at: <https://snowexproducts.com/why-buy/why-super-maxx/> on Jun. 2, 2018.

Ventrac, “Video Sidewalk Drop Spreader”. Retrieved from the Internet at: <https://www.ventrac.com/video/LWA82-i5MJk> on Jun. 2, 2018.

Ventrac, “SA250 Sidewalk Drop Spreader”. Retrieved from the Internet at:<https://www.ventrac.com/products/accessories/sa250> on Jun. 2, 2018.

* cited by examiner

AGITATION ASSEMBLIES FOR A SPREADER

CROSS-REFERENCE TO RELATED APPLICATION

This application claims the priority benefit of U.S. Provisional Application No. 62/849,690, filed May 17, 2019, which is hereby incorporated by reference herein in its entirety.

FIELD OF THE DISCLOSURE

The present disclosure generally relates to material spreading devices and, more particularly, to material spreading devices having hoppers and rotatable feeding mechanisms.

BACKGROUND

Spreaders can be mounted to vehicles to distribute spreading material, such as sand, salt, and/or grit, onto desired surfaces. In some forms, the spreading material can be contained within a hopper and driven to a dispensing opening of the hopper by an auger. One problem that can occur with this configuration is when the spreading material compacts or clumps above and/or beside the auger, preventing the spreading material from reaching the auger. Some spreaders can utilize vibrator motors to agitate the spreading material. Vibrator motors, however, can be destructive to components of the spreader due to the high frequency and high impact methods that vibrator motors utilize to provide agitation. Moreover, vibrator motors can increase the noise output of the spreader.

SUMMARY

The present disclosure is directed to an agitation assembly for a spreader that includes an agitation member extending over a rotatable feeding mechanism within a hopper. The agitation assembly utilizes the rotation of the feeding mechanism to oscillate the agitation member to thereby agitate spreading material in the hopper. More specifically, a connecting linkage can mechanically couple the agitation member to a crank mounted to the feeding mechanism to convert the rotational movement of the feeding mechanism to linear movement of a portion of the connecting linkage to thereby oscillate the agitation member, which can include pivoting or sliding the agitation member. In some forms, the agitation member can be a baffle or an agitation plate.

In accordance with a first aspect, an agitation assembly for a spreader is described including a crank configured to operably couple to a rotatable feeding mechanism to be rotated therewith about a longitudinal axis of the feeding mechanism. A drive pin of the crank has a radially offset position with respect to the longitudinal axis. The agitation assembly further includes a connecting linkage configured to couple the drive pin of the crank to an agitation member to oscillate the agitation member while the feeding mechanism rotates.

According to one form, the crank includes a shaft configured to extend coaxially with the feeding mechanism and be mounted to the feeding mechanism to be rotated thereby.

According to another form, the agitation assembly further includes a hopper having walls defining an interior, the feeding mechanism, and the agitation member can be a baffle.

According to a further form, the feeding mechanism can be an auger and the auger can extend within a portion of the hopper along the longitudinal axis and includes a flight to drive a spreadable material disposed within the hopper. The baffle is disposed adjacent to the auger within the hopper. In another form, the auger can include a shaft disposed along the longitudinal axis, where the flight extends outwardly from the shaft.

According to some further forms, the agitation assembly can include one or more of the following. For example, the hopper can include end walls, side walls having inwardly angled portions, and a bottom trough, where the feeding mechanism extends within the bottom trough and the baffle extends over an open top of the bottom trough; the baffle can include first and second wall portions at an angle with respect to one another, where each of the first and second wall portions include outwardly projecting teeth; and the agitation assembly can further include a drive mechanism that is operably coupled to the feeding mechanism to drive rotation of the feeding mechanism.

According to a further form, the connecting linkage includes an arm and a bracket coupled to the baffle and having a hinged connection with the arm that is offset from a longitudinal axis of the baffle such that rotation of the drive pin causes the baffle to pivotably oscillate through the connecting linkage. According to a further form, the baffle includes a first end and an opposite, second end, where the first and second ends are pivotably coupled to the hopper to be rotatable about a longitudinal axis of the baffle. According to yet a further form, the baffle includes separated first and second portions, where the separated first and second portions are pivotably coupled together about a pin connection extending through a brace coupled to the hopper.

According to a further form, the connecting linkage is a member coupled to the baffle in a pivotably restricted configuration such that rotation of the drive pin causes the baffle to vertically oscillate. According to a further form, the baffle includes a first end pivotably coupled to the hopper about a rotation axis generally perpendicular to a longitudinal axis of the baffle and an opposite, second end coupled to the member.

According to a further form, the connecting linkage includes a release mechanism to uncouple the connecting linkage from the drive pin of the crank. According to a further form, the agitation assembly includes a stationary arm configured to couple to the connecting linkage after the connecting linkage is uncoupled from the drive pin of the crank to provide a fixed connection for the connecting linkage to thereby lock the baffle in a fixed state.

According to another form, the agitation assembly can further include a hopper including walls and a trough defining an interior, the feeding mechanism extending within the trough of the hopper along the longitudinal axis and being rotatable about the longitudinal axis and including a flight to drive a spreadable material disposed within the hopper. An offset wall extends across a portion of the interior. The offset wall has an interior edge vertically offset from an interior edge of an opposite wall of the hopper. In this form, the agitation member is an agitation plate movably coupled to the offset wall and having a distal edge align over the trough.

According to a further form, the agitation plate can have a pivot connection with the offset wall, and the connecting linkage includes an arm and a bracket coupled to the agitation plate and having a pivot connection with the arm on an opposite side of the agitation plate from the offset wall, such that rotation of the drive pin causes the agitation plate to pivotably oscillate through the connecting linkage. In yet a further form, the pivot connection between the agitation plate and the offset wall can include brackets of the agitation plate and the offset wall coupled by a pin extending therebetween.

According to a further form, the agitation plate can have a sliding connection with the offset wall, such that rotation of the drive pin causes the agitation plate to slidably oscillate over a portion of the offset wall through the connecting linkage. In yet further forms, the connecting linkage can include first and second arms pivotably coupled together and a bracket coupled to the agitation plate and having a pivotable connection with the second arm; and/or the sliding connection between the agitation plate and the offset wall can include brackets of the agitation plate and the offset wall couple by a pin extending therebetween, the bracket of the agitation plate having a slot opening allowing the pin to shift therein for the agitation plate to slidably oscillate over a portion of the offset wall.

According to some versions, the agitation assemblies of the above forms can include one or more of the following aspects: the feeding mechanism can be an auger and, in a further form, the auger can include a shaft disposed along the longitudinal axis, the flight extending outwardly from the shaft; the offset wall can include one of the side walls; the agitation plate can include teeth portions extending outward from the distal edge thereof; the connecting linkage can include a release mechanism to uncouple the connecting linkage from the drive pin of the crank, which can further include a stationary arm configured to couple to the connecting linkage after the connecting linkage is uncoupled from the drive pin of the crank to provide a fixed connection for the connecting linkage to thereby lock the baffle in a fixed state; or a drive mechanism operably coupled to the feeding mechanism to drive rotation of the feeding mechanism.

In accordance with a second aspect, a method for oscillating an agitation member in a spreader is provided including rotating a feeding mechanism extending within a portion of a hopper about a longitudinal axis, rotating a crank operably coupled to the feeding mechanism, where the crank includes a drive pin having a radially offset position with respect to the longitudinal axis of the feeding mechanism, and oscillating an agitation member disposed adjacent to the feeding mechanism within the hopper with a connecting linkage coupled between the drive pin of the crank and the baffle.

According to one form, oscillating the agitation member can include oscillating a baffle with the connecting linkage. In further forms, agitating the baffle with the connecting linkage includes pivotably oscillating the baffle via a bracket coupled to the baffle and having a pivot connection with an arm of the connecting linkage offset from a longitudinal axis of the baffle and/or vertically oscillating the baffle with an connecting member coupled between the drive pin and the baffle and coupled to the baffle in a pivotably restricted configuration.

According to another form, the hopper can include end walls, side walls, and an offset wall extending between the end walls and from one of the side walls across a portion of the interior, where the offset wall has an interior edge vertically offset from an interior edge of the other side wall. In this form, oscillating the agitation member can include oscillating an agitation plate movably coupled to the offset wall. In further forms, oscillating the agitation plate can include pivotably oscillating the agitation plate via a bracket coupled to the agitation plate and having a pivot connection with an arm of the connecting linkage on an opposite side of the agitation plate from the offset wall or slidably oscillating the agitation plate over a portion of the offset wall via a bracket coupled to agitation plate and having a pivot connection with an arm of the connecting linkage.

In accordance with a third aspect, a method for installing an agitation assembly in a spreader is provided, including securing a crank to a feeding mechanism to be rotated therewith about a longitudinal axis of the feeding mechanism, where the crank includes a drive pin that has a radially offset position with respect to the longitudinal axis, and coupling a connecting linkage between the drive pin of the crank and an agitation member such that rotation of the feeding mechanism oscillates the agitation member through the connecting linkage.

According to one form, coupling the connecting linkage between the drive pin of the crank and the agitation member can include coupling the connecting linkage between the drive pin of the crank and a baffle. According to further forms, the method can include pivotably mounting an end of the baffle opposite the connecting linkage to the hopper and/or the baffle can include separated first and second portions, and the method can further include pivotably coupling the separated first and second portions together about a pin connection extending through a brace coupled to the hopper.

According to another form, the spreader can include a hopper walls defining an interior and an offset wall extending cross a portion of the interior of the hopper, where the offset wall has an interior edge vertically offset from an interior edge of an opposite wall of the hopper. In this form, coupling the connecting linkage between the drive pin of the crank and the agitation member can include coupling the connecting linkage between the drive pin of the crank and an agitation plate movably coupled to the offset wall. In a further form, the method can include securing the offset wall to one of the walls of the hopper and movably securing the agitation plate to the offset wall. In yet further forms, movably securing the agitation plate to the offset wall can include pivotably coupling the agitation plate to the offset wall or slidably coupling the agitation plate to the offset wall.

According to another form, the method further includes coupling the connecting linkage to the drive pin of the crank with a release pin and mounting a stationary arm to a fixed position, where the stationary arm is configured to couple to the connecting linkage after the connecting linkage is uncoupled from the drive pin of the crank to lock the baffle in a fixed state.

According to other forms, the method includes mounting the feeding mechanism so that a portion of feeding mechanism extends within a hopper along a longitudinal axis and mounting the agitation member adjacent to the feeding mechanism within the hopper.

BRIEF DESCRIPTION OF THE DRAWINGS

It is believed that the disclosure will be more fully understood from the following detailed description, particularly when studied in conjunction with the drawings, wherein.

Figure 1:
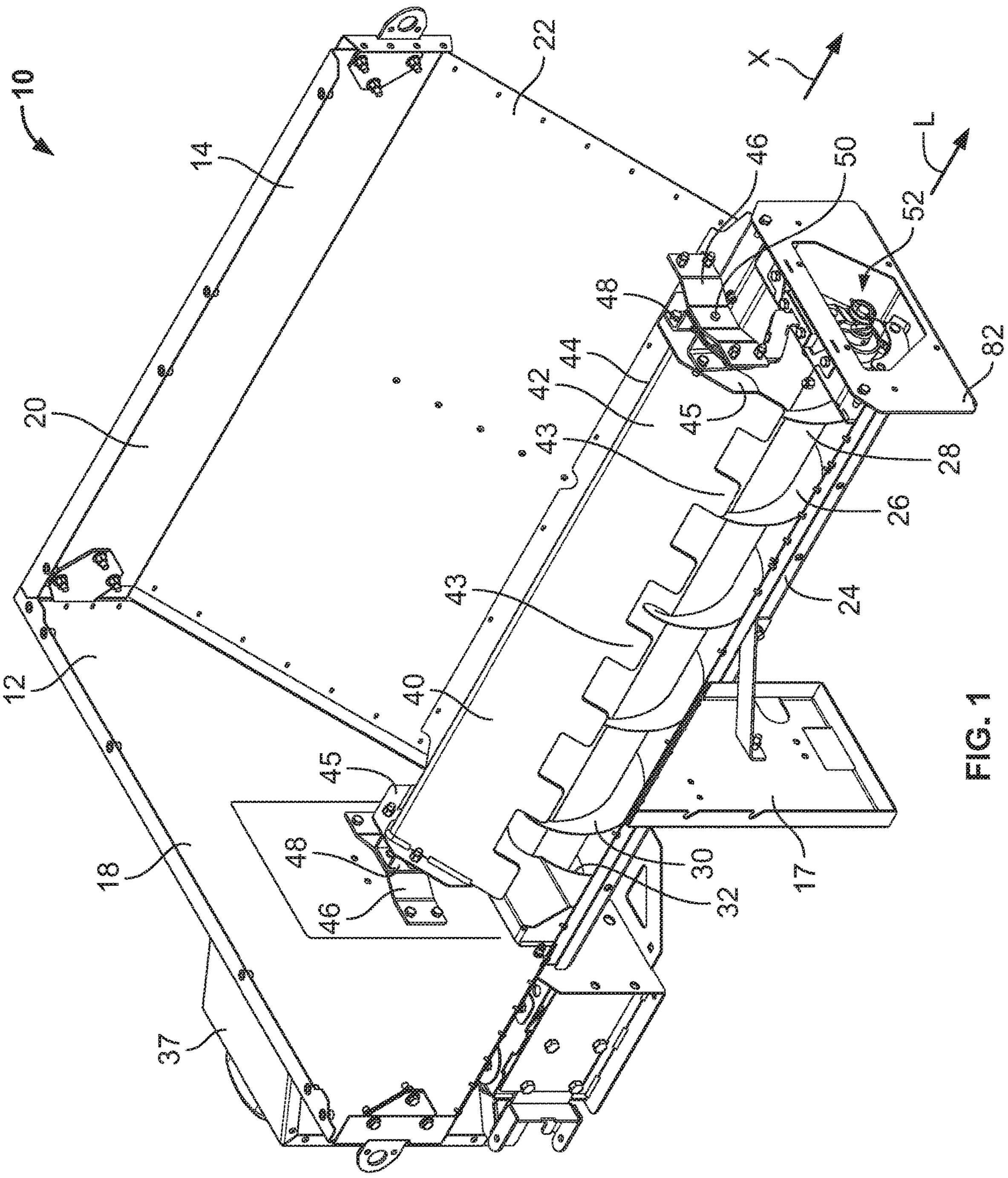
FIG. 1 is a sectional perspective view of one embodiment of a spreader having an agitation assembly in accordance with the present disclosure.
Figure 2:
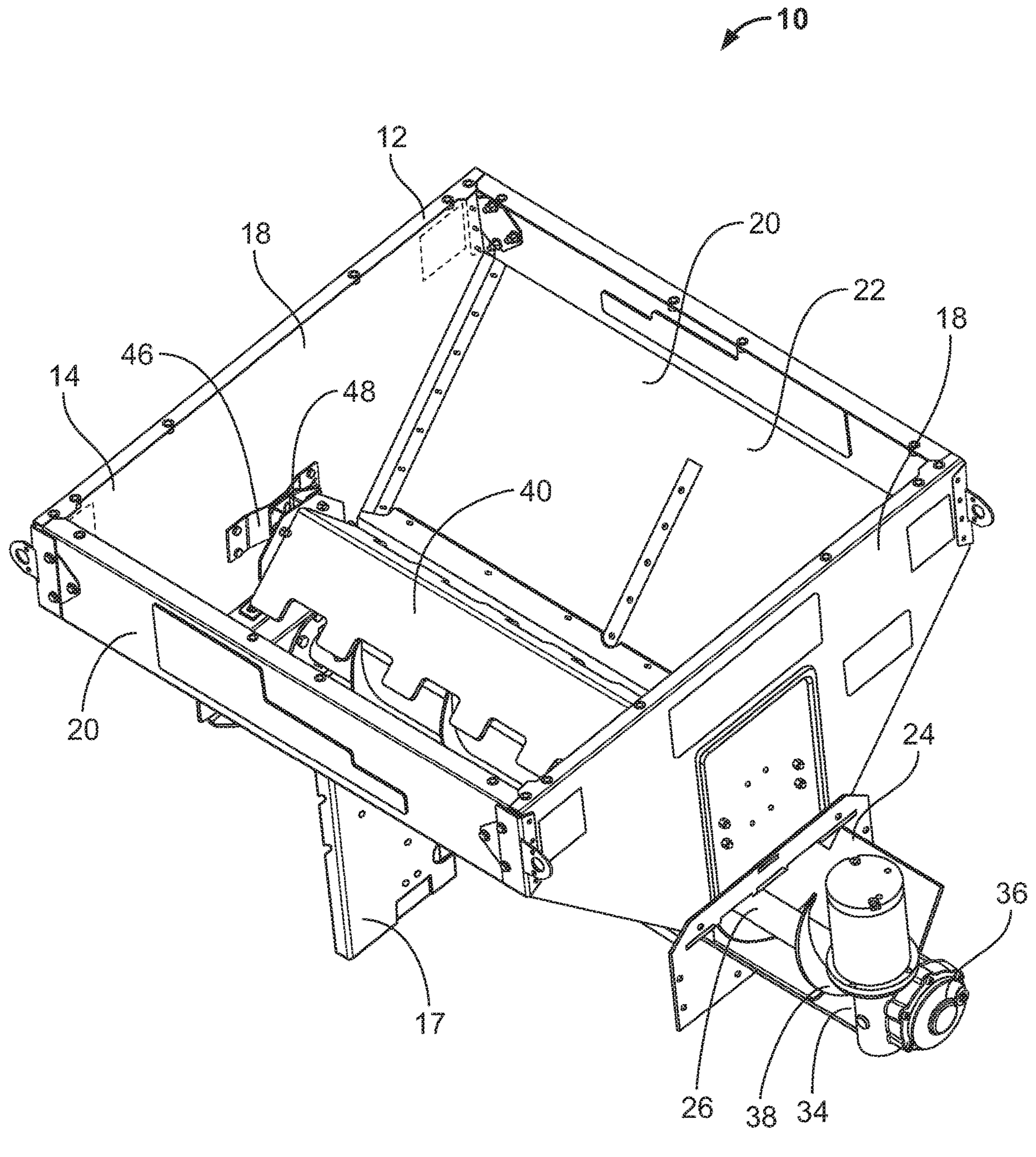
FIG. 2 is a rear perspective view of the spreader of FIG. 1 in accordance with the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Agitation assemblies for a spreader having a rotatable feeding mechanism and a baffle are described herein that can provide a constant slow agitation of the baffle to keep spreading material loose and free flowing, especially spreading material that may compress or clump, such as sand, salt, and so forth. The constant pushing and mixing by agitation keeps the spreading material loose and free flowing, which advantageously expands the range of potential spreading materials the spreader is capable of dispensing.

The agitation assemblies of the present disclosure utilize rotation of the feeding mechanism to agitate the baffle, such that a common drive mechanism can operate the feeding mechanism and agitate the baffle. More specifically, a crank is coupled to the feeding mechanism and a connecting linkage connects between the baffle and the crank so that as the drive mechanism rotates the feeding mechanism to dispense spreading material towards a dispensing opening, the connecting linkage oscillates the baffle. This configuration eliminates the need to use a vibrator motor to prevent build up and bridging of the spreading material around the feeding mechanism. In comparison to the use of a vibrator motor, the present assemblies provide low frequency, low impact agitation that results in less wear and less impact on the components of the assemblies while utilizing the same drive mechanism as the feeding mechanism.

A first embodiment of a spreader 10 is shown in FIGS. 1-5. The spreader 10 includes a hopper 12 having walls 14 defining an interior to receive a desired spreading material 16, such as sand, salt, and so forth. One or more of the walls 14 can include sloped surfaces that direct the spreading material downwardly to a bottom of the hopper 12. The hopper 12 can be supported by base structure 17 for mounting to a suitable vehicle. The hopper walls 14 can include end walls 18, side walls 20, and a bottom trough 24. In the illustrated form, the side walls 20 include inwardly sloped portions 22 extending to the bottom trough 24 and the end walls 18 are generally vertical extending upwardly from ends of the trough 24. It will be understood that the end and side walls 18, 20 can have opposite configurations or can have other suitable configurations that direct the spreading material to the bottom trough 24. The assembly 10 further includes a rotatable feeding mechanism 26, which is in the illustrated form is an auger having a central shaft 28 extending along a longitudinal axis L and a flight 30 wound around the central shaft 28. Although one flight 30 is shown, the auger 26 can include two or more flights as desired. Other suitable feeding mechanisms 26 can include a shaft that drives a chain or belt, a drum, and so forth. As such, it will be understood that although embodiments are described herein having an auger feeding mechanism, each of the embodiments could alternatively utilize other suitable rotatable feeding mechanisms.

As shown in FIG. 1, the auger 26 is disposed within the bottom trough 24 from adjacent one end wall 18 of the hopper 12 through an opening 32 in the other end wall 18 of the hopper 12. With this configuration, the sloped portions 22 of the hopper sidewalls 20 directs the spreading material 16 into the bottom trough 24 and the auger 26 drives the spreading material 16 to a dispensing opening 34 (FIG. 2) at the end of the bottom trough 24. Although not shown, a suitable spreading mechanism and associated components, such as a spinner with a supplying chute, can be disposed within the flow path of the spreading material adjacent to the dispensing opening to distribute the spreading material on a desired surface. A drive mechanism 36 (FIG. 2), such a gas, electric, or hydraulic motor, is mounted outside of the hopper 12 and coupled to a first end 38 of the auger 26 to selectively drive rotation of the auger 26. If desired, the spreader 10 can include a housing 37 for the drive mechanism 36.

The spreader 10 further includes a baffle 40 having first and second walls 42, 44 disposed at an angle with respect to one another in a wedge configuration. If desired, the first and second walls 42, 44 can include outwardly projecting teeth portions 43 configured to further breakup the spreading material 16. The baffle 40 extends between the end walls 18 of the hopper 12 above the auger 26 to direct the spreadable material 16 towards the sloped portions 22 of the side walls 20. The baffle 40 can further include end plates 45 utilized to secure the baffle 40 to desired structures. In the illustrated form, the baffle 40 is pivotably coupled to the end walls 18 of the hopper 12 with hopper and baffle brackets 46, 48 having pin pivot connections 50 therebetween that allow the brackets 46, 48 to pivot with respect to one another about a longitudinal axis X of the baffle 40.

Figure 3:
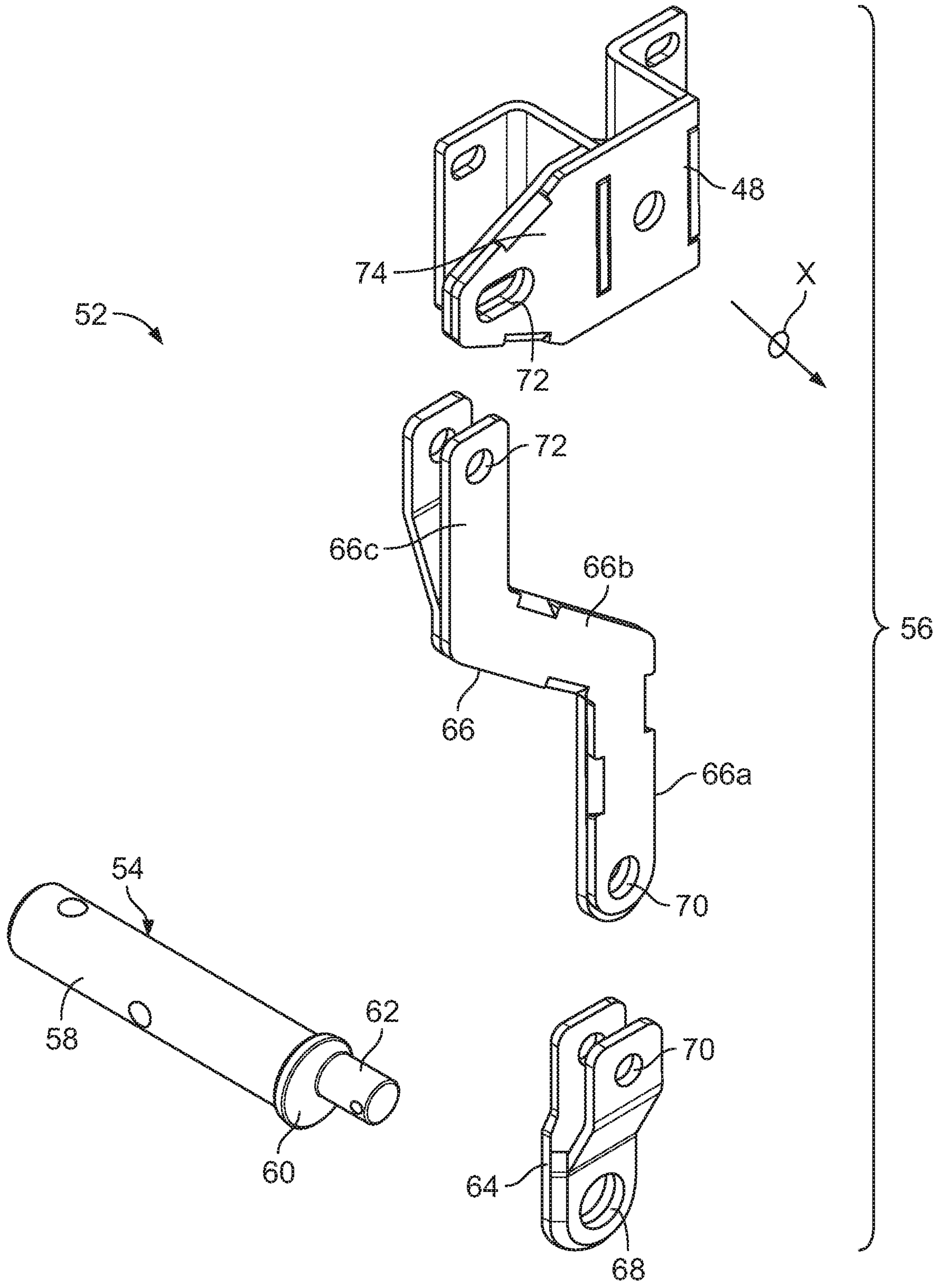
FIG. 3 is an exploded perspective view of an agitation assembly for a spreader in accordance with the present disclosure.
Figure 4:
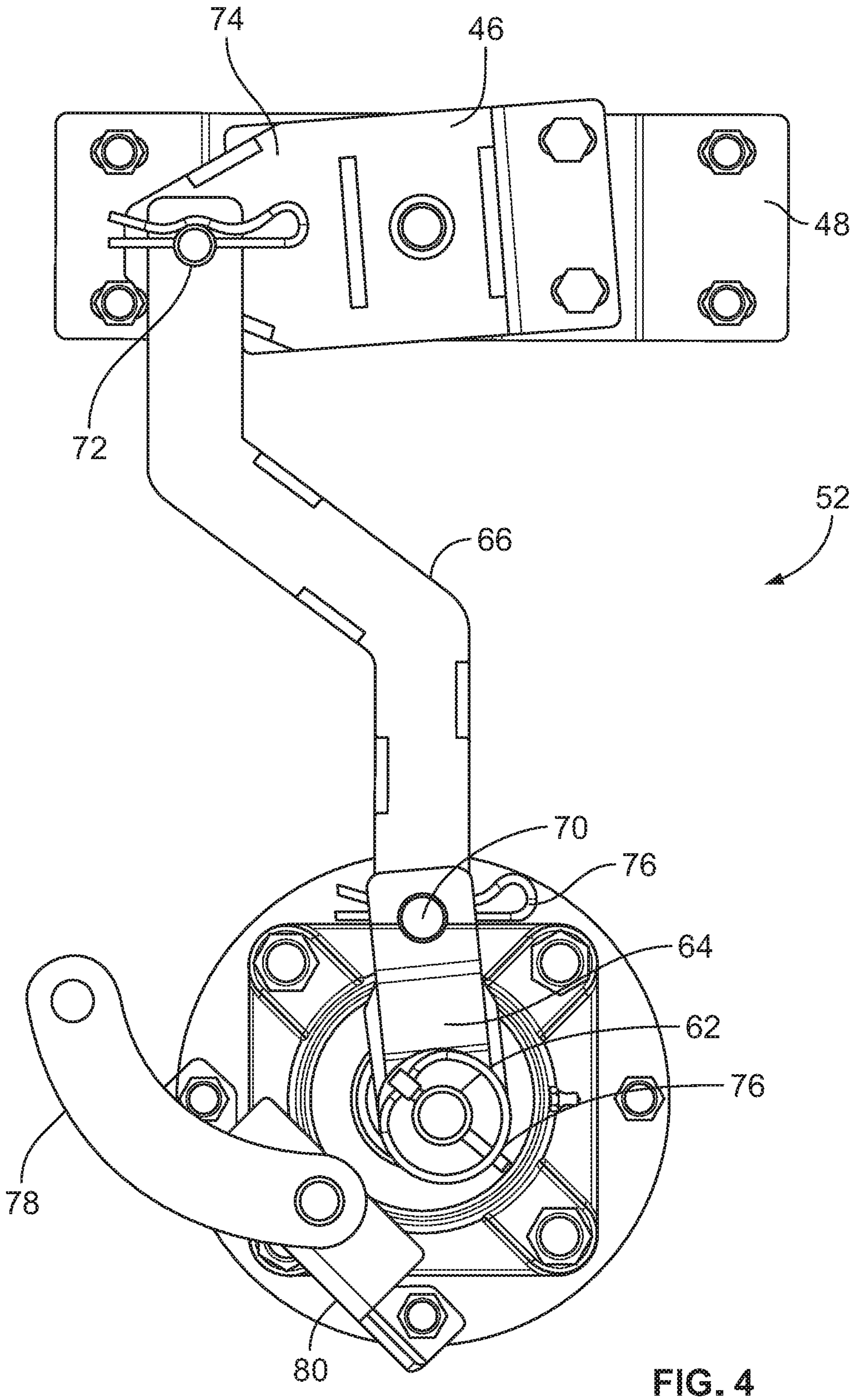
FIG. 4 is a front elevation view of the agitation assembly of FIG. 3 mounted to an auger and baffle in accordance with the present disclosure.

Details of an agitation assembly 52 are shown in FIGS. 3 and 4. The agitation assembly 52 includes a crank 54 and a connecting linkage 56 that mechanically couples the crank 54 to the baffle bracket 48. The crank 54 includes a shaft portion 58, an end plate 60, and a drive pin 62 that is radially offset with respect to a longitudinal axis of the shaft portion 58. The crank 54 can be secured to the auger 26, such as with the shaft portion 58 extending co-axially within the central shaft 28 of the auger 26, so that crank 54 rotates with the auger 26 and the drive pin 62 is radially offset from the longitudinal axis L of the auger 26. The connecting linkage 56 of this form includes a drive pin bracket 64 and a rigid connecting arm 66. The drive pin bracket 64 has a through opening 68 sized to receive the drive pin 62 therethrough. A first pin connection 70 pivotably couples the drive pin bracket 64 and the connecting arm 66 together and a second pin connection 72 couples the connecting arm 66 and the baffle bracket 48 together.

So configured, as the drive mechanism 36 rotates the auger 26, the crank 54 rotates therewith and the drive pin 62 follows an annular rotation path. The connecting linkage 56 is driven in a piston-like manner to thereby oscillate upward and downward. As shown in FIG. 4, the baffle bracket 48 includes the second pin connection 72 for coupling with the connecting arm 66 in a wall portion 74 laterally offset from the longitudinal axis X of the baffle 40. As such, the upward and downward oscillations of the connecting linkage 56 causes the baffle to pivotably oscillate about the pin pivot connections 50. Advantageously, with this configuration, the drive mechanism 36 can reverse operation and rotation of the auger 26 to clear a jamming situation with the spreading material 16.

If desired, the connecting linkage 56 can be disengaged from the drive pin 62 using a release pin 76 that removably couples to the drive pin 62 to hold the drive pin bracket 64 on the drive pin 62. Further, the spreader 10 can include a stationary arm 78 that is pivotably coupled to a fixed structure 80. Accordingly, to disengage the agitation assembly 52, a user can remove the release pin 76, slide the drive pin bracket 64 off the drive pin 62, and connect the drive pin bracket 64 to the stationary arm 78. The release pin 76 can be provided in one of the pin connections 70, 72 and the stationary arm 78 can alternatively couple to the connecting arm 66 or baffle bracket 48. With this configuration, tools are not required to change the baffle 40 from an agitating mode to standard locked mode.

Figure 5:
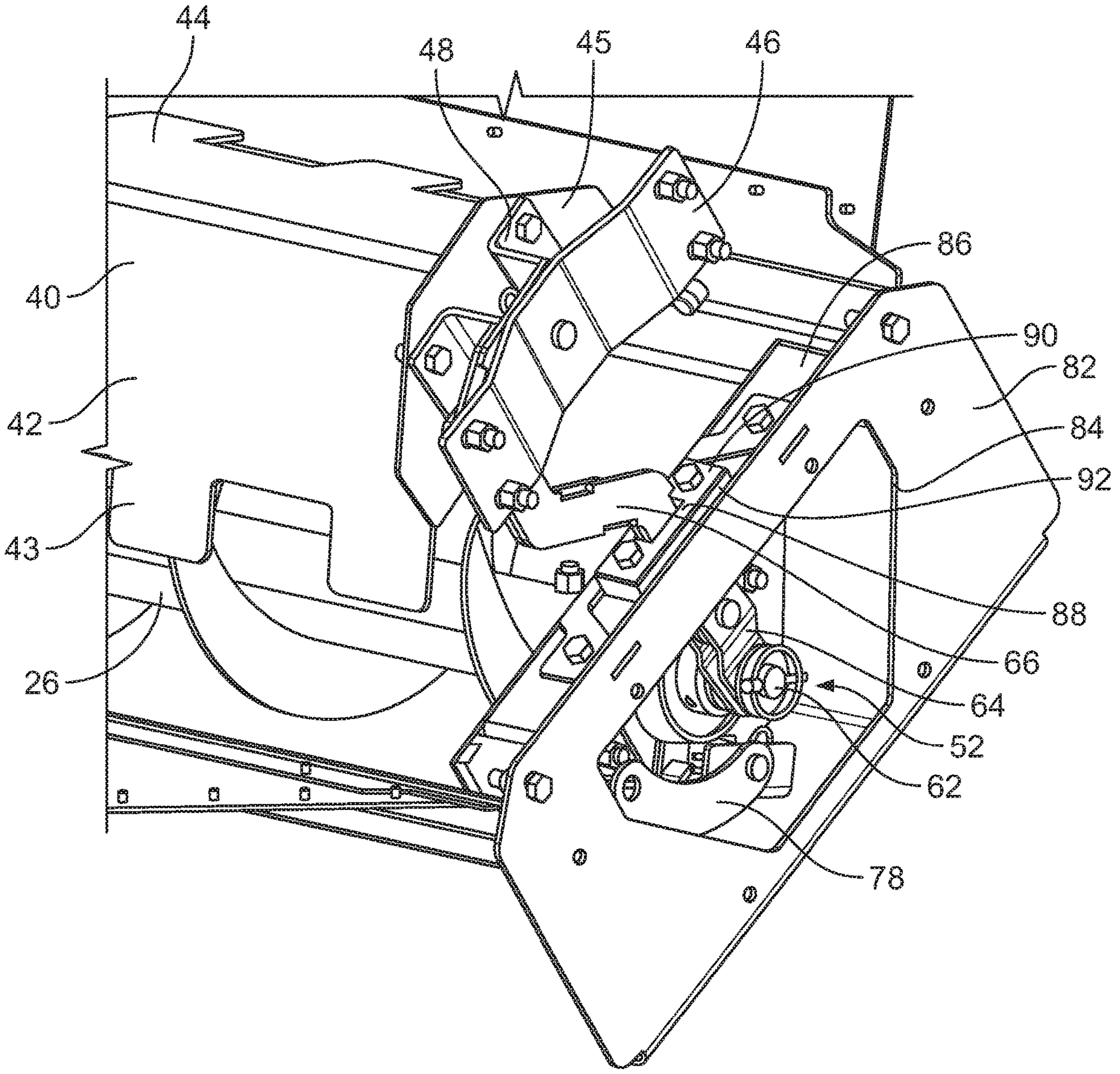
FIG. 5 is a sectional perspective view of the spreader of FIG. 1 showing an agitation assembly mounted to an auger and baffle in accordance with the present disclosure.

As shown in FIG. 5, the bottom trough 24 of the hopper 12 may include a rear housing portion 82 defining an access opening 84 to the crank 54 and having a top wall portion 86 that extends between the crank 54 and the baffle bracket 48. The top wall portion 86 can include a slot opening 88 to allow the connecting arm 66 to pass therethrough. If desired, the slot opening 88 can have a width so that the connecting arm 66 has a small clearance of between about 1/32 inch to about 1 inch, so that the slot opening 88 restricts lateral movement of the connecting arm 66, such that rotation of the crank 54 drives vertical oscillations of the connecting arm 66. If desired, a plate member 90 with an opening for the connecting arm 66 can be bolted to the top wall portion 86 with a guide member 92 sandwiched therebetween. The guide member 92 advantageously creates a taller channel through which the connecting arm 66 oscillates and can have a low coefficient of friction, being made of a suitable plastic material such as acetal resin, to ease operation of the agitation assembly 52. Further, the guide member 92 can operate as a seal to minimize spreading material from passing through the slot opening 88. As best shown in FIG. 3, the connecting arm 66 includes a first vertical portion 66*a*, a second angled portion 66*b*, and a third vertical portion 66*c*. This configuration allows the first vertical portion 66*a* to pass through the slot opening 88, while the second angled portion 66*b* aligns the third vertical portion 66*c* with the pivot connection 72 of the baffle bracket 48.

Figure 6:
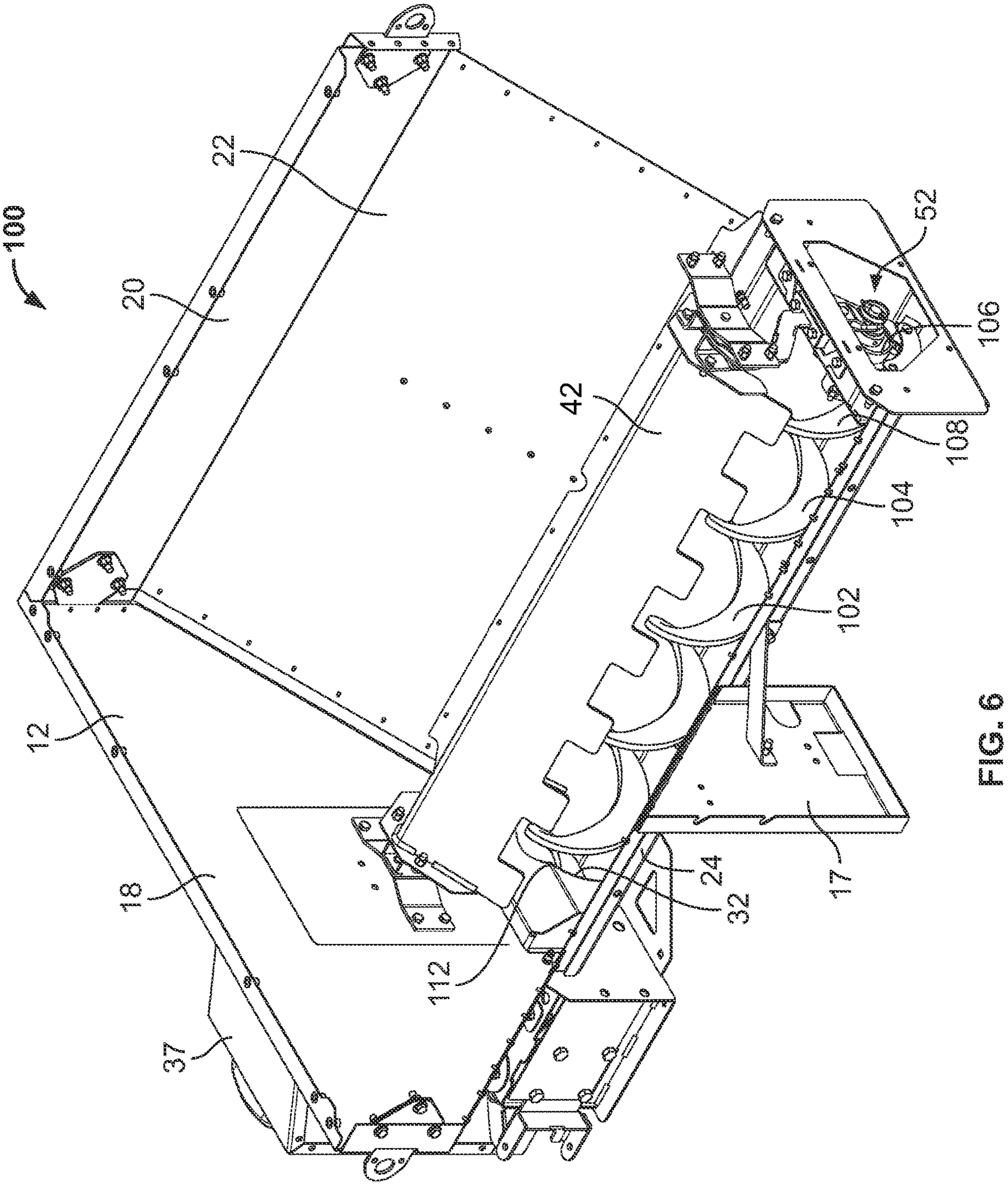
FIG. 6 is a sectional perspective view of another embodiment of a spreader having a shaftless auger in accordance with the present disclosure.

A second embodiment of a spreader 100 is shown in FIG. 6. In this embodiment, the spreader 100 utilizes a shaftless auger 102 having a spiraling flight 104 without a central shaft as with the above embodiment. The spreader 100 of this form mainly utilizes components similar to the above embodiment and, as such, only the differences will be described herein.

The shaftless auger 102 can include mounting structure 106 at a first end 108 thereof to secure the auger 102 to the agitation assembly 52 and specifically the crank shaft portion 58 thereof. The shaftless auger 102 can further include mounting structure (not shown) to couple to the drive mechanism 36 at a second end 112 thereof. The mounting structure 106, 110 can take any suitable form, such as a cylinder to receive a coupling shaft, a mounting plate, combinations thereof, and so forth. The shaftless auger 102 advantageously only contacts the spreading material 16 with the flight 104 during operation to minimize undesirable compacting and allows the spreading material 16 to be freely deposited into the bottom trough 24 of the hopper 12.

Figure 7:
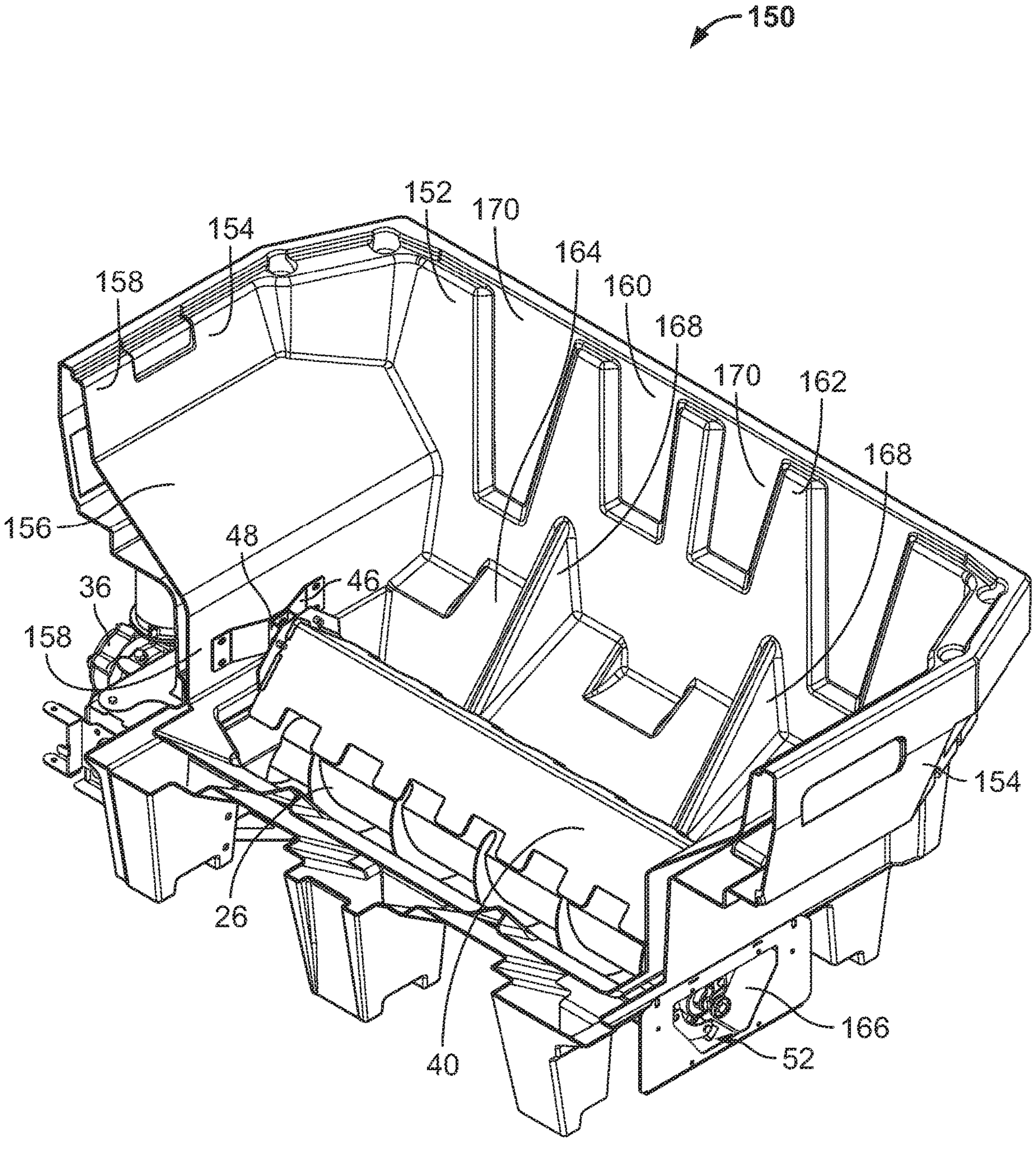
FIG. 7 is a sectional perspective view of another embodiment of a spreader in accordance with the present disclosure.

A third embodiment of a spreader 150 is shown in FIG. 7, the spreader 150 utilizes a hopper 152 having a different configuration than the above hopper 12. The hopper 152 of this form includes end walls 154 having intermediate sloped portions 156 and generally vertical portions 158. Side walls 160 of the hopper 152 include generally vertical portions 162 and sloped portions 164 that direct material flow to a bottom trough 166. The hopper 152 can have a double walled configuration as shown to add strength to the hopper 152 and/or to provide desired structures on the interior and exterior of the hopper 152. Further, the end and side walls 154, 160 can include ribs 168 and recesses 170 to strengthen the hopper 152 and/or aid in directing flow of the spreading material. The remaining components of the spreader 10 discussed above can be utilized in with this hopper 152. Further, the shaftless auger 102 described above with respect to FIG. 6 can alternatively be utilized with this hopper 152.

Figure 8:
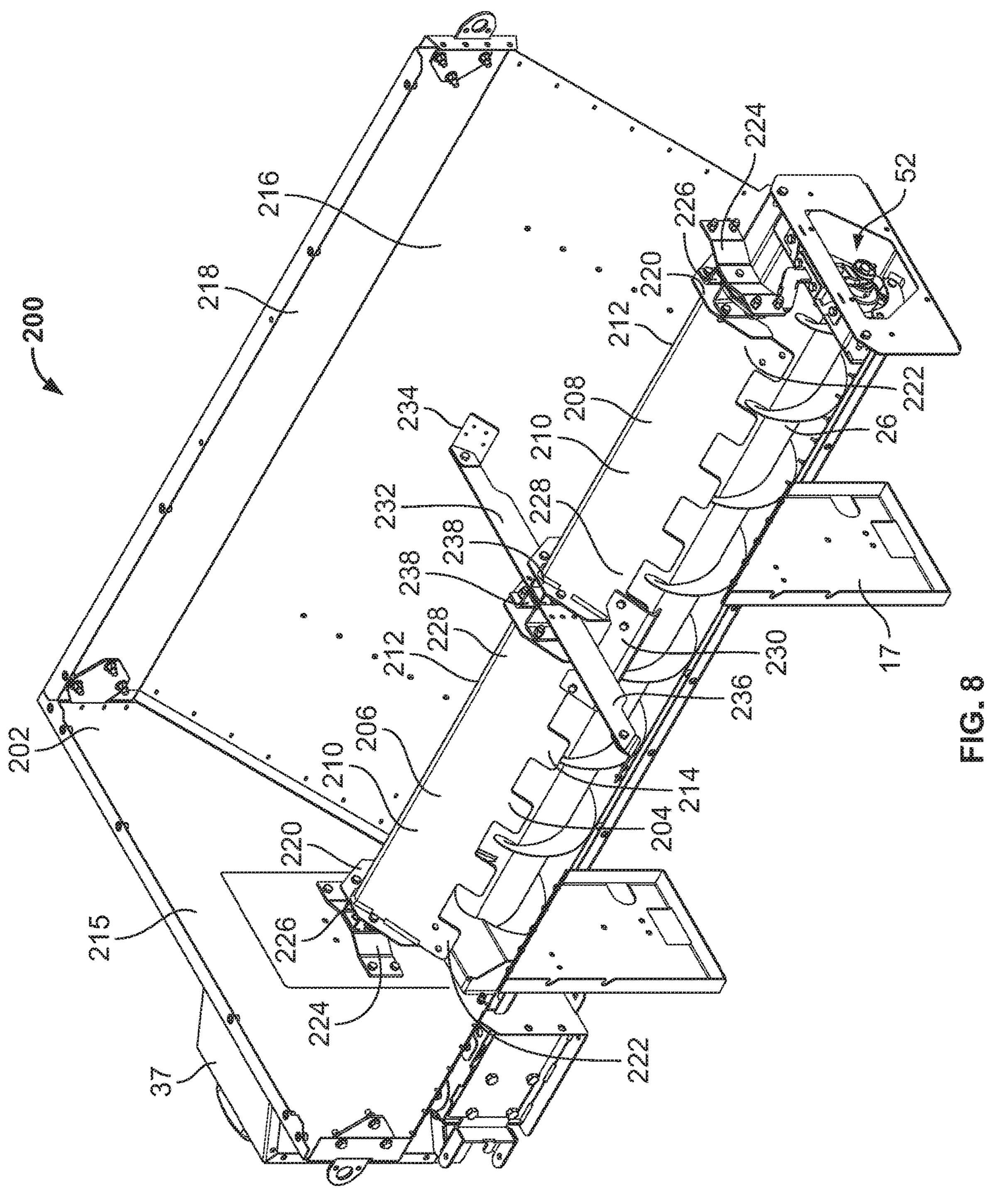
FIG. 8 is a sectional perspective view of another embodiment of a spreader having two baffle portions pivotably coupled together in accordance with the present disclosure.

A fourth embodiment of a spreader 200 is shown in FIG. 8. The spreader 200 of this form mainly utilizes components similar to the above embodiment and, as such, only the differences will be described herein. The above embodiment includes a single piece baffle 40 supported on ends thereof. While this is suitable for many circumstances, with larger hoppers, for instance, the baffle can be separated into multiple pieces. In the illustrated form, the spreader 200 includes a relatively longer hopper 202 such that a baffle 204 for the spreader 200 has first and second portions 206, 208 secured together to operate similarly with the above baffle embodiment.

Each of the first and second portions 206, 208 have first and second walls 210, 212 disposed at an angle with respect to one another in a wedge configuration. If desired, the first and second walls 210, 212 can include outwardly projecting teeth portions 214 configured to further breakup the spreading material 16. The baffle 204 extends between end walls 215 of the hopper 202 above the auger 26 to direct the spreadable material 16 towards sloped portions 216 of side walls 218 of the hopper 202. Each baffle portion 206, 208 includes end plates 220 utilized to secure the baffle 206, 208 to desired structures.

In the illustrated form, each baffle portion 206, 208 has an outer end 222 pivotably coupled to the end walls 215 of the hopper 202 with hopper and baffle brackets 224, 226 configured as described above. As shown in FIG. 8, the baffle portions 206, 208 are also operably coupled together at intermediate ends 228 thereof. The corresponding first and second walls 210, 212 of the baffle portions 206, 208 are rigidly coupled together with brackets 230 that span the gap therebetween. Further, the baffle portions 206, 208 can be pivotably coupled to a brace 232 spanning between the hopper side walls 218 and coupled thereto with brackets 234 that mount to the sloped portions 216 of the side walls 218. The brace 232 includes a vertically oriented member 236 having a pin opening (not shown) therethrough. The baffle portions 206, 208 can then pivotably couple to the brace 232 and to each other using pin brackets 238 configured similarly to the end baffle brackets 226. With this configuration, the brace 232 provides a central support for the two baffle portions 206, 208 while the baffle portions 206, 208 are rigidly coupled together, but also allowed to oscillate when driven by the connecting linkage 56 described above.

Figure 9:
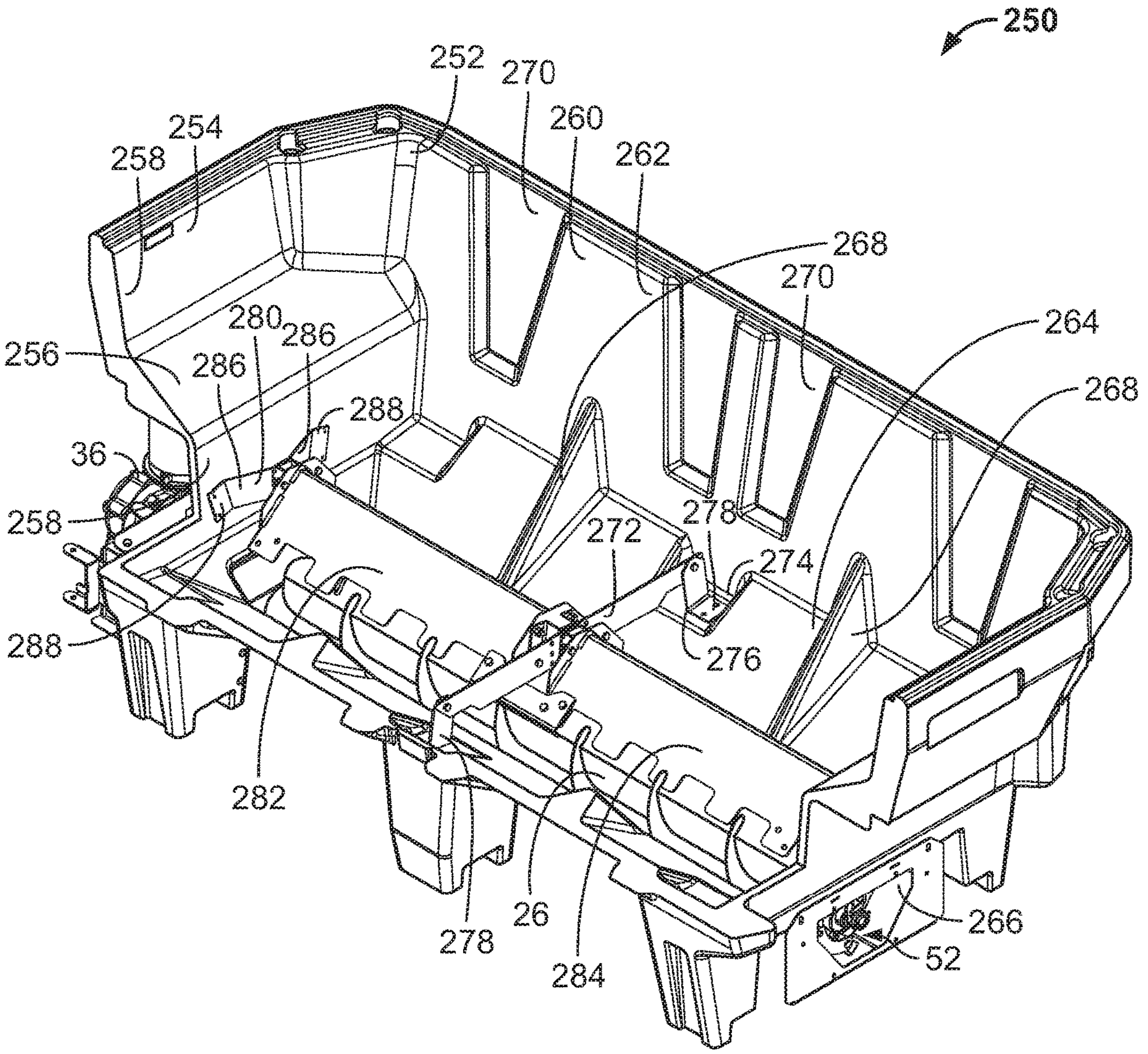
FIG. 9 is a sectional perspective view of another embodiment of a spreader having two baffle portions pivotably coupled together in accordance with the present disclosure.

A fifth embodiment of a spreader 250 is shown in FIG. 9, the spreader 250 utilizes a hopper 252 having a different configuration than the above hopper 202. The hopper 252 of this form includes end walls 254 having intermediate sloped portions 256 and generally vertical portions 258. Side walls 260 of the hopper 252 includes generally vertical portions 262 and sloped portions 264 that direct material flow to a bottom trough 266. The hopper 252 can have a double walled configuration as shown to add strength to the hopper 252 and/or to provide desired structures on the interior and exterior of the hopper 252. Further, the end and side walls 254, 260 can include ribs 268 and recesses 270 to strengthen the hopper 252 and/or aid in directing flow of the spreading material.

As shown, the spreader 250 of this form includes a brace 272 configured similarly to the above brace 232. With this hopper 252, however, the side walls 260 can include recesses 274 with a flat bottom surface 276 to receive brackets 278 to pivotably mount the brace 272 to the hopper 252. The remaining components of the spreader 200 discussed above can be utilized in with this hopper 252. Further, the shaftless auger 102 described above with respect to FIG. 6 can alternatively be utilized with this hopper 252. Additionally, hopper brackets 280 pivotably coupling first and second brace portions 282, 284 to the hopper 252 can have a spread configuration with outwardly projecting side walls 286 and angled wall mounts 288 as compared to the above housing brackets 224.

Figure 10:
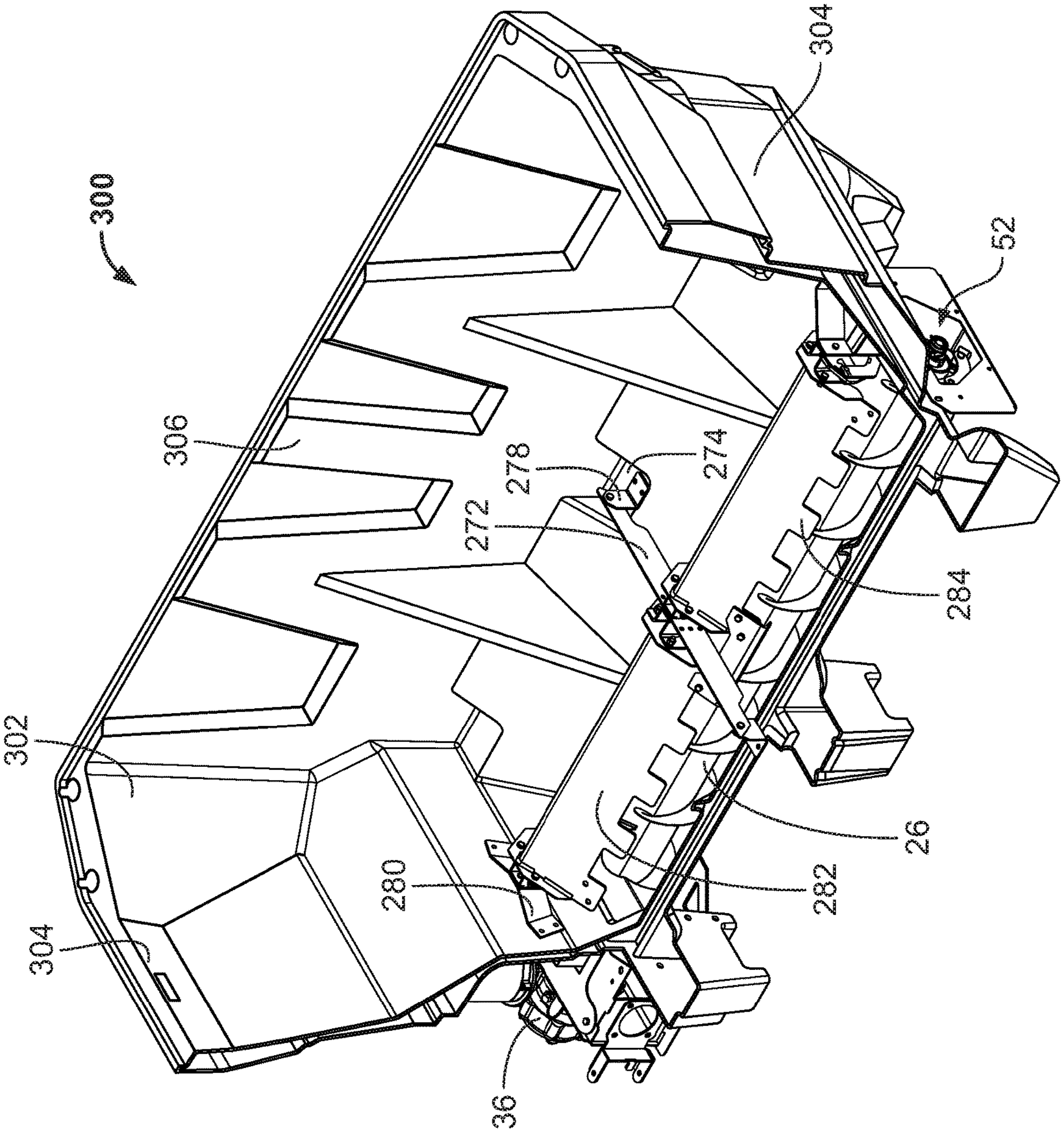
FIG. 10 is a sectional perspective view of another embodiment of a spreader having two baffle portions pivotably coupled together in accordance with the present disclosure.
Figure 11:
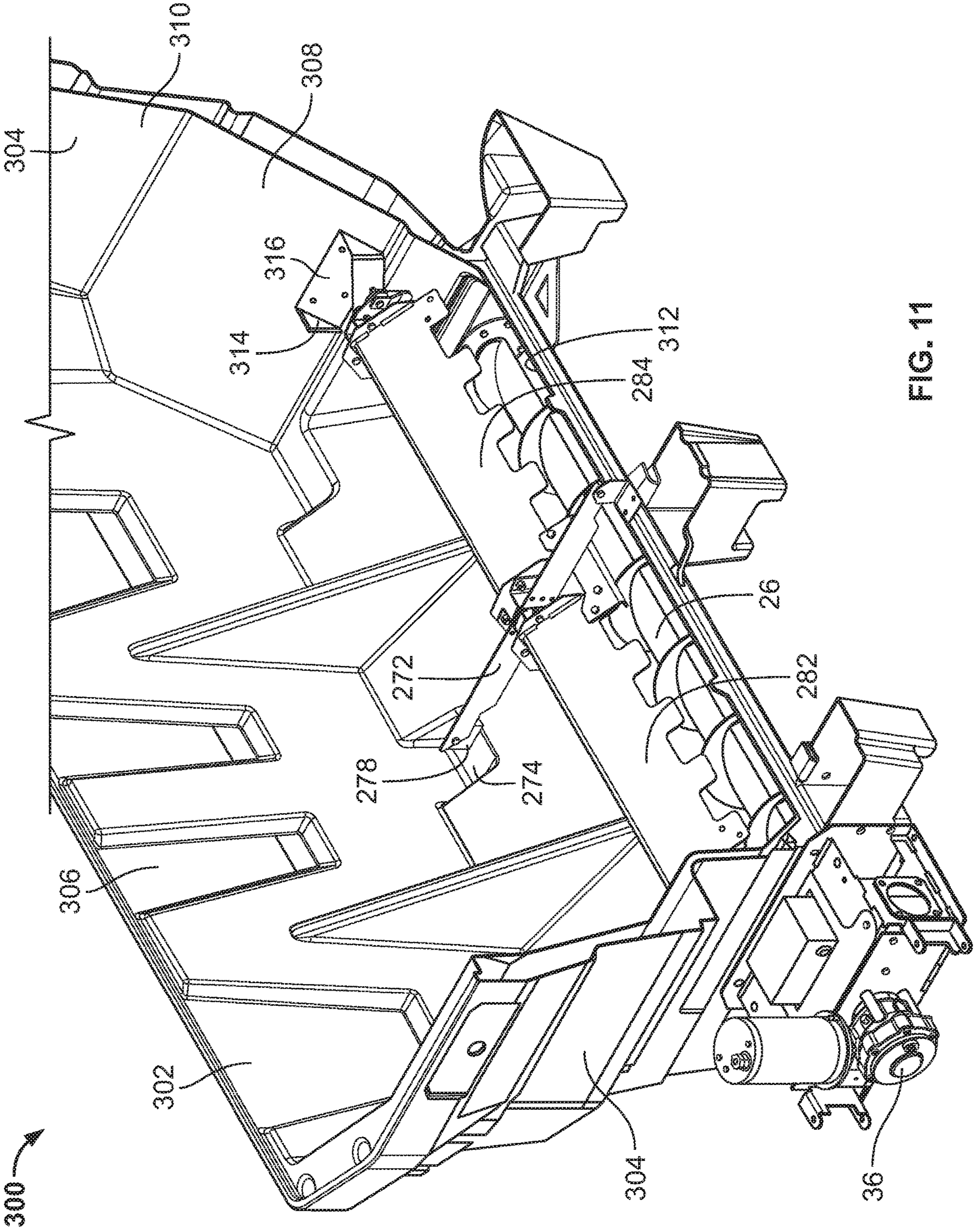
FIG. 11 is a rear sectional perspective view of the spreader of FIG. 10 in accordance with the present disclosure.

A sixth embodiment of a spreader 300 is shown in FIGS. 10 and 11. This form is similar to the above fifth spreader embodiment 250, except a hopper 302 of this form has a larger interior volume with relatively taller end walls 304 and sidewalls 306. Pursuant to this, while the other components of the spreader 300 can be the same, the hopper 302 of this form, one of the end walls 304 has a sloped portion 308 that extends from a top, generally vertical portion 310 to a bottom trough 312. So configured, a hopper bracket 314, as best shown in FIG. 11, includes an angled wall mount 316 to extend along and couple to the sloped portion 308.

Figure 12:
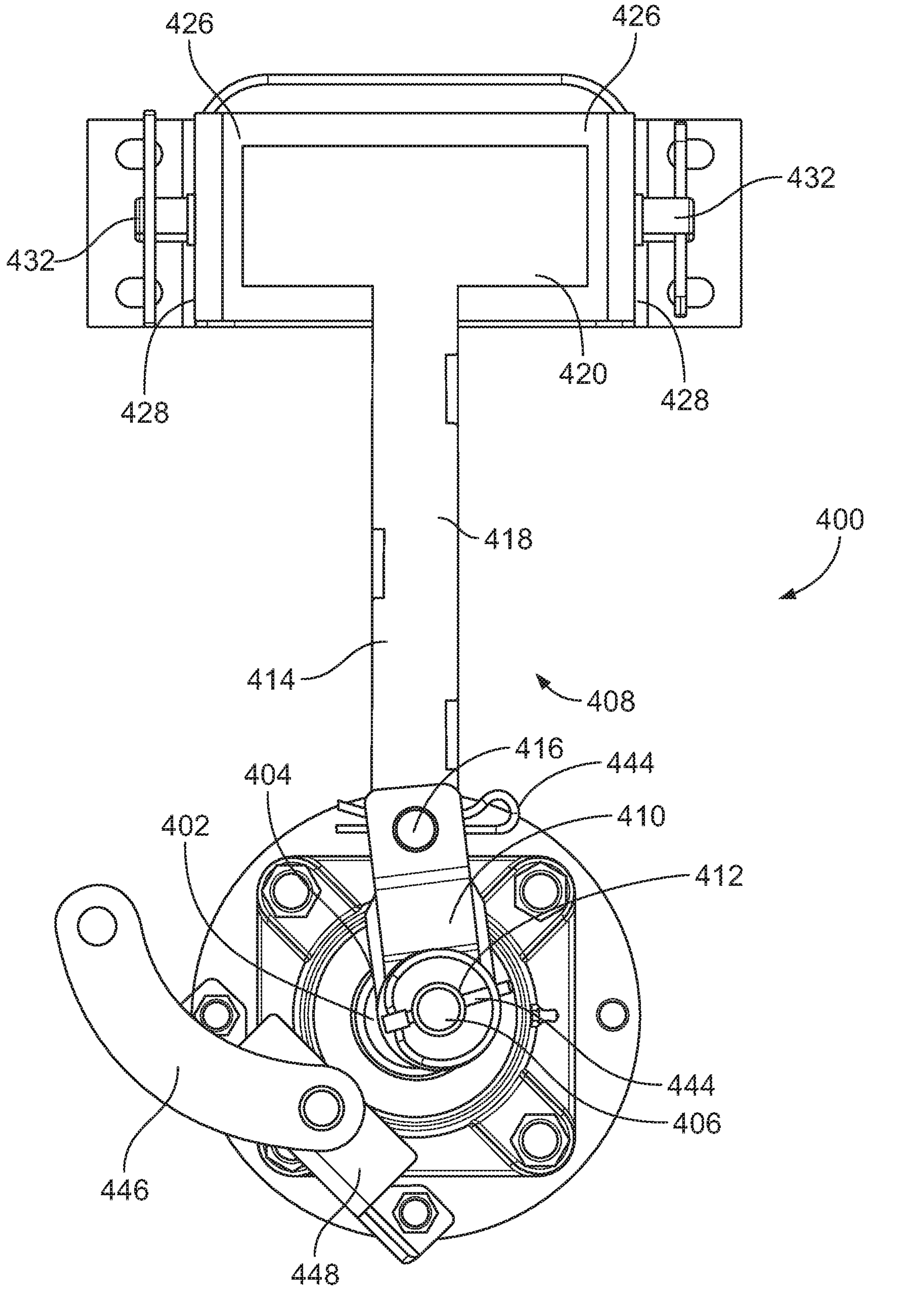
FIG. 12 is a front elevational view of another embodiment of an agitation assembly for a spreader in accordance with the present disclosure.
Figure 13:
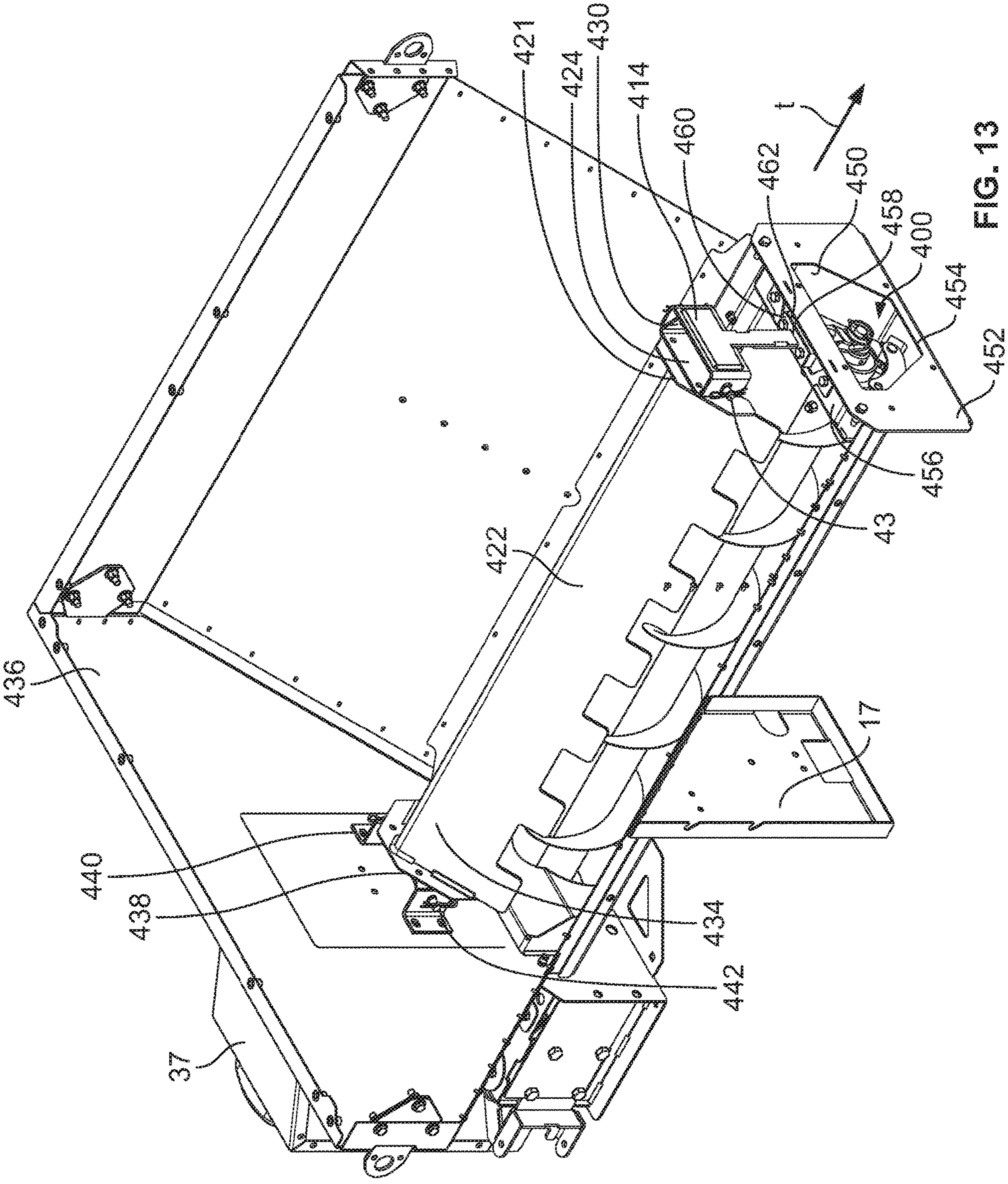
FIG. 13 is a sectional perspective view of one embodiment of a spreader with the agitation assembly of FIG. 12 mounted to an auger and baffle in accordance with the present disclosure.

Another embodiment for an agitation assembly 400 is shown in FIGS. 12 and 13. In this form, the agitation assembly 400 includes a crank 402 configured similar to the embodiment described above with a shaft portion (not shown), end plate 404, and drive pin 406. The agitation assembly 400 further includes a connecting linkage 408 that includes a drive pin bracket 410 with a through opening 412 sized to receive the drive pin 406 therethrough and a rigid connecting member 414. A pin connection 416 pivotably couples the drive pin bracket 410 and the connecting member 414 together. As shown, the connecting member 414 includes an elongate shaft portion 418 that couples to the drive pin bracket 410 and a baffle coupling portion 420 that fixedly couples to one end 421 of a baffle 422 with a baffle bracket 424. The baffle 422 can have a configuration as set forth above with respect to the baffle of the above embodiments. More specifically, the baffle coupling portion 420 includes laterally projecting sides 426 to give the connecting member 414 a T-shape and outwardly projecting walls 428 to extend adjacent to walls 430 of the baffle bracket 424. Pin connections 432 couple the walls 428 of the connecting member 414 to the walls 430 of the baffle bracket 424. So configured, rotational movement about the baffle axis X is restricted, while vertical movement is transferred to the baffle 422.

With the one end 421 of the baffle 422 secured to the connecting member 414, the other end 434 is pivotably secured to a hopper 436. Although the hopper of the first embodiment is shown in FIG. 13, it will be understood that any of the above hoppers can be utilized in combination with this embodiment by virtue of the various mounting brackets and components described herein. As shown, the hopper 436 and the baffle 422 couple together using a baffle bracket 438 and a hopper bracket 440 that have lateral pin connections 442 therebetween such that the baffle bracket 438 is rotatable about an axis generally perpendicular to the baffle longitudinal axis X.

So configured, as the drive mechanism 36 rotates the auger 26, the crank 402 rotates therewith and the drive pin 406 follows an annular rotation path. The connecting linkage 408 is driven in a piston-like manner to thereby oscillate upward and downward. The upward and downward oscillations of the connecting linkage 408 cause the baffle 422 to vertically oscillate. Advantageously, with this configuration, the drive mechanism 36 can advantageously reverse operation and rotation of the auger 26 to clear a jamming situation with the spreading material 16.

If desired, similar to the above connecting linkage 56, the connecting linkage 408 of this form can be disengaged from the drive pin 406 using a release pin 444 that removably couples to the drive pin 406 to hold the drive pin bracket 410 on the drive pin 406. Further, a stationary arm 446 can be provided that is pivotably coupled to a fixed structure 448. Accordingly, to disengage the agitation assembly 400, a user can remove the release pin 444, slide the drive pin bracket 410 off the drive pin 406, and connect the drive pin bracket 410 to the stationary arm 446. Of course, the release pin 444 can alternatively or additionally be provided in the pin connection 416 and the stationary arm 446 can couple to the connecting member 414. With this configuration, tools are not required to change the baffle 422 from an agitating mode to standard locked mode.

As shown in FIG. 13, similar to the above forms, a bottom trough 450 of the hopper 436 may include a rear housing portion 452 defining an access opening 454 to the crank 402 and having a top wall portion 456 that extends between the crank 402 and the baffle bracket 424. The top wall portion 456 can include a slot opening 458 to allow the elongate shaft portion 418 of the connecting member 414 to pass therethrough. If desired, the slot opening 458 can have a width so that the connecting member 414 has a small clearance of between about 1/32 inch to about 1 inch, so that the slot opening 458 restricts lateral movement of the connecting member 414, such that rotation of the crank 402 drives vertical oscillations of the connecting member 414. If desired, a plate member 460 with an opening for the connecting member 414 can be bolted to the top wall portion 456 with a guide member 462 sandwiched therebetween. The guide member 462 advantageously creates a taller channel through which the connecting member 414 oscillates and can have a low coefficient of friction, being made of a suitable plastic material such as acetal resin, to ease operation of the agitation assembly 400. Further, the guide member 462 can operate as a seal to minimize spreading material from passing through the slot opening 458.

Figure 15:
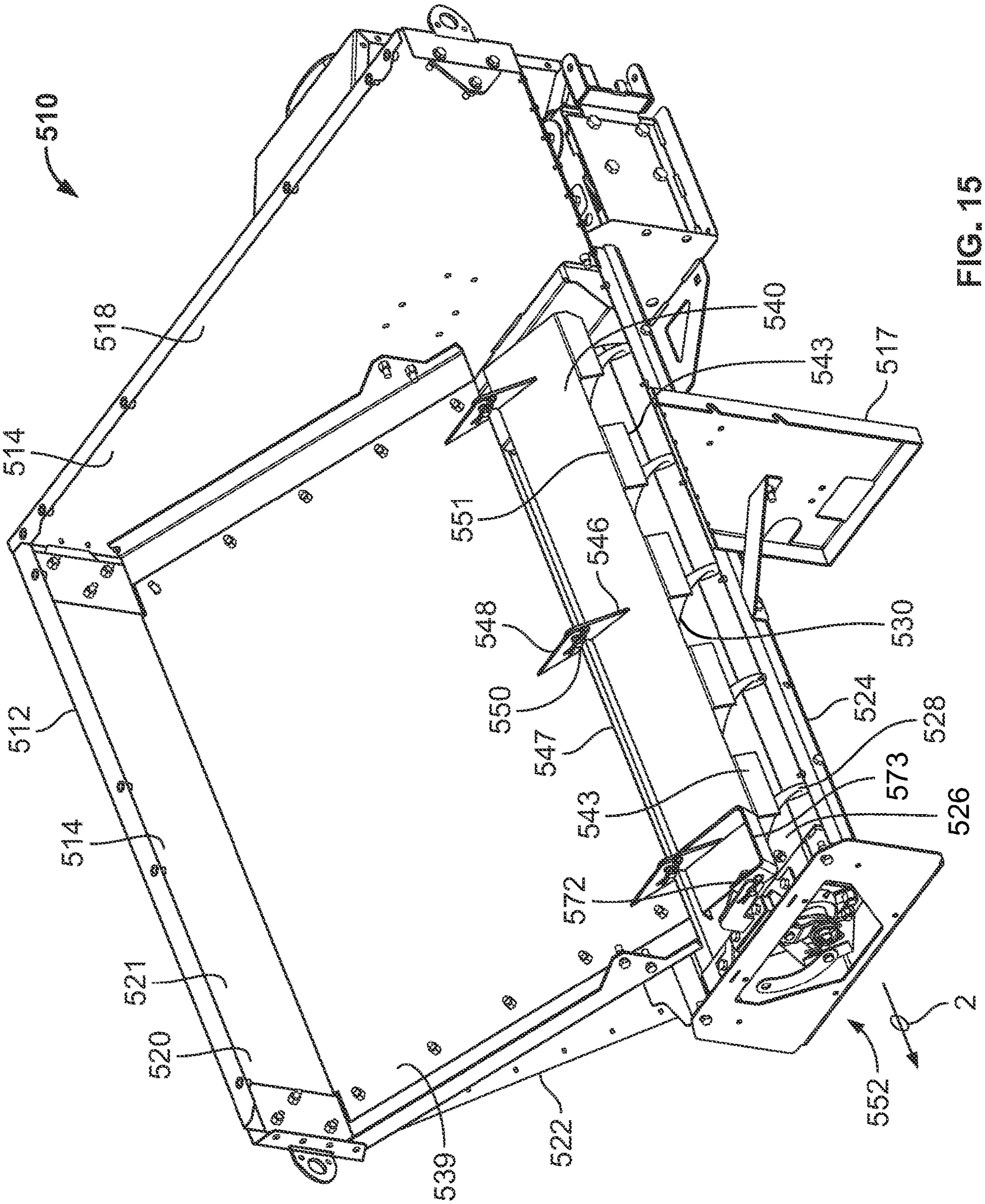
FIG. 15 is a sectional perspective view of another embodiment of a spreader having a pivoting agitation assembly in accordance with the present disclosure.
Figure 16:
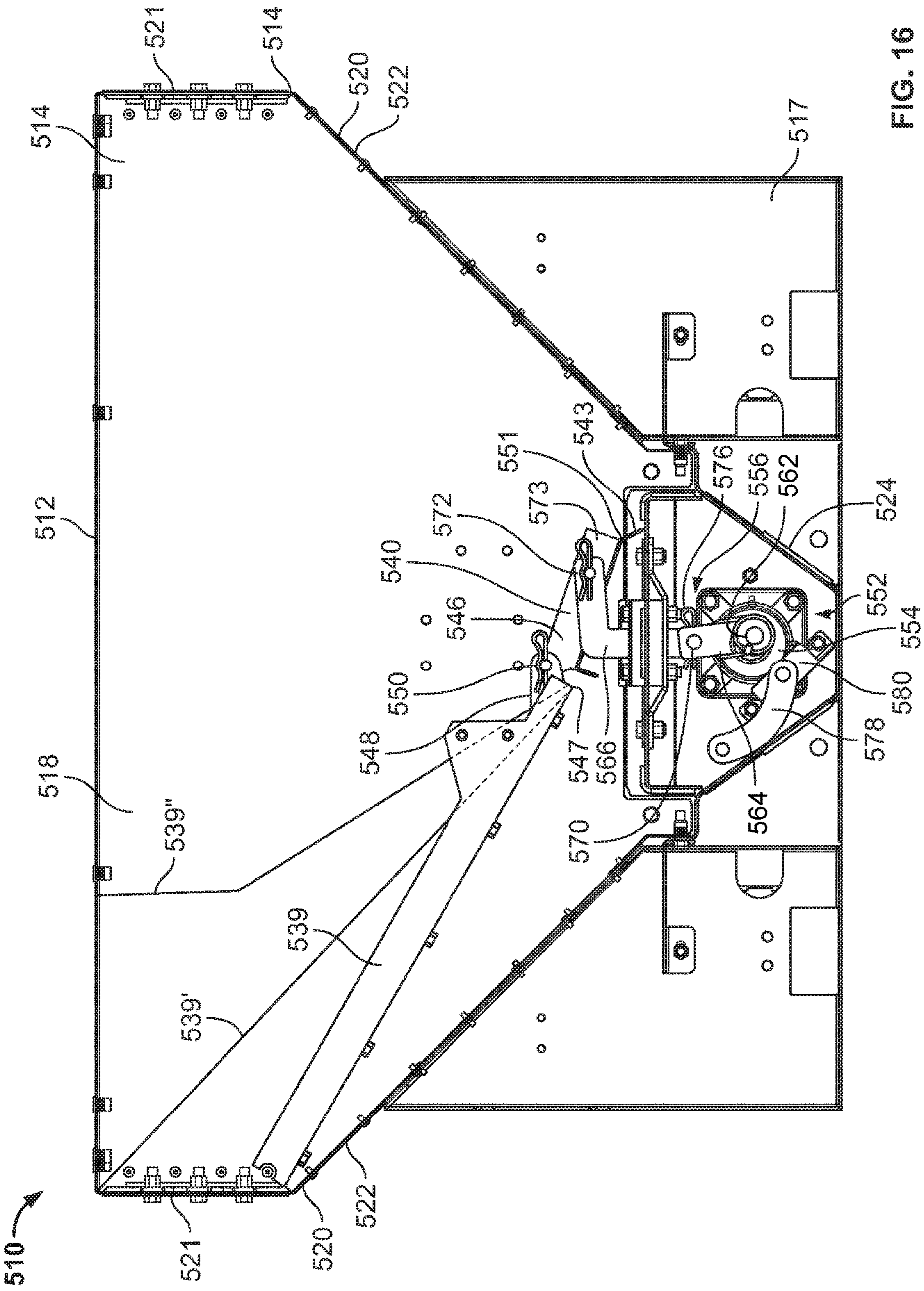
FIG. 16 is a side cross-sectional view of the spreader of FIG. 15 in accordance with the present disclosure.
Figure 17:
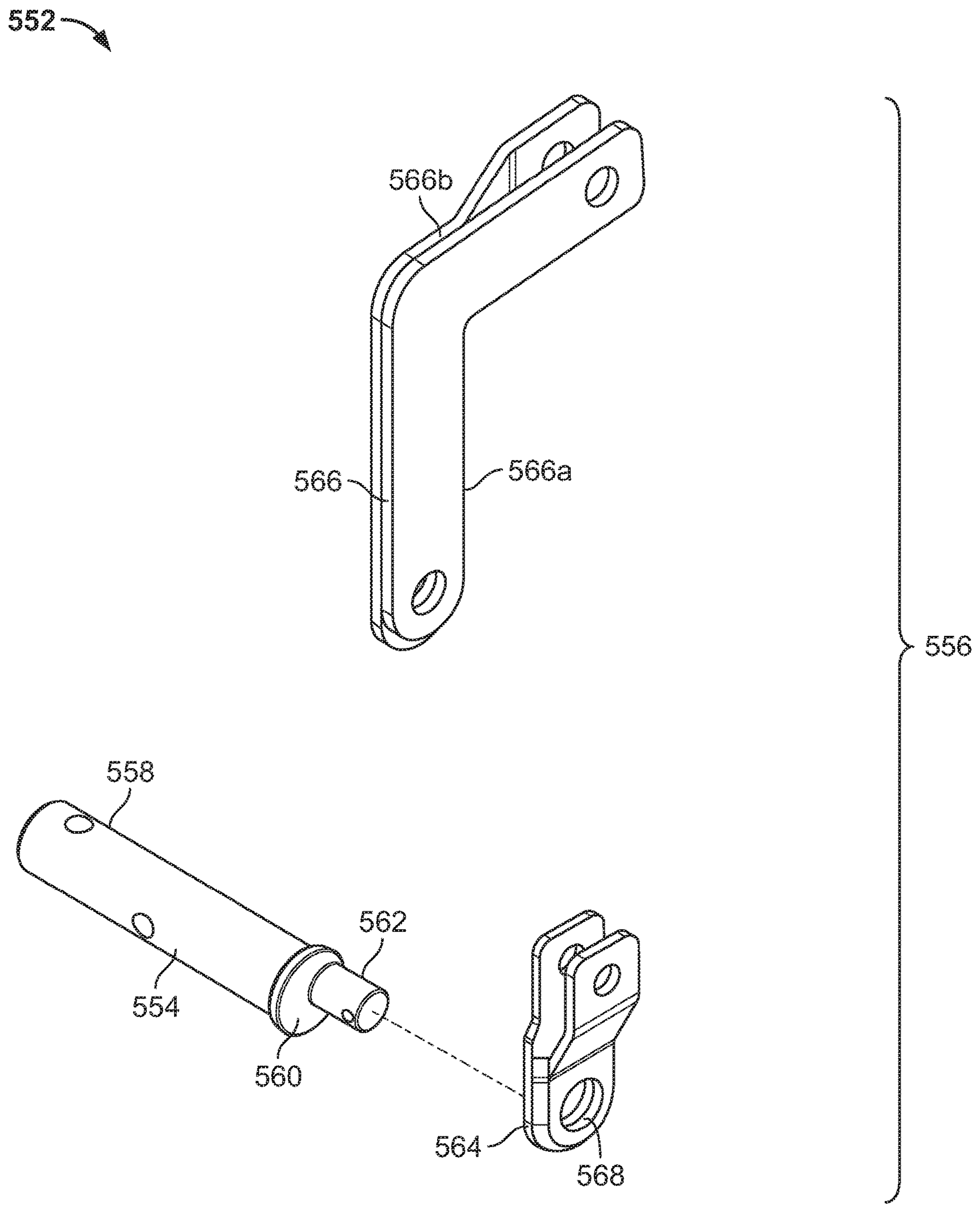
FIG. 17 is an exploded view of components of the pivoting agitation assembly for the spreader of FIG. 15 in accordance with the present disclosure.

A sixth embodiment of a spreader 510 is shown in FIGS. 15-17. The spreader 510 includes a hopper 512 having walls 514 defining an interior to receive a desired spreading material, such as sand, salt, and so forth. The hopper 512 can be supported by base structure 517 for mounting to a suitable vehicle, trailer, etc. The hopper walls 514 include generally vertical end walls 518, side walls 520 having top vertical portions 521 and lower, inwardly sloped portions 522, and a bottom trough 524. The assembly 510 further includes an auger 526 having a central shaft 528 extending along a longitudinal axis L and a flight 530 wound around the central shaft 528. Although one flight 530 is shown, the auger 526 can include two or more flights as desired. The auger 526 and hopper 512 configuration of this form is similar to the above embodiment described with reference to FIGS. 1 and 2 and, as such, the above description is incorporated herein.

The spreader 510 of this form includes a retrofit assembly for the hopper 512 that includes an offset wall 539 and an agitation plate 540. As shown, the offset wall 539 is fixedly coupled to one of the side walls 520 and is fixedly coupled to and extends between the end walls 518, such as using brackets and fasteners as shown or welding. With this configuration, the offset wall 539 extends across about half the hopper interior so that an interior edge 547 is aligned over the auger 526 or otherwise over the trough 524. As best shown in FIG. 16, the offset wall 539 extends above the inwardly sloped portion 522 of the one side wall 520. The offset wall 539 can extend within the hopper 512 at any desired angle. For example, the offset wall 539 can extend at a more gradual angle with respect to the sloped portion 522 of the side wall 502, the offset wall 539', 539" can extend a steeper angle, or can extend at the same angle.

The agitation plate 540 of this form is pivotably coupled to the offset wall 539 along the interior edge 547 thereof so that the plate 540 extends between, but is spaced from, the hopper end walls 518. The agitation plate 540 and the offset wall 539 can have respective brackets 546, 548 that pivotably couple together with a pin connection 550 that allow the brackets 546, 548 to pivot with respect to one another about a longitudinal axis X of the hopper 512. In one form, the pin connections 550 can be held together with a cotter pin at one end and retention structures at opposite ends. As shown, the agitation plate 540 and the offset wall 539 can include a plurality of the pin connections 550 therebetween, such as three as shown, two, or more than three. The agitation plate 540 has a width to extend from the interior edge 547 of the offset wall 539 over the trough 524 so that an opposite edge 551 is aligned to deposit material to the opposite side of the auger 526 with respect to the offset wall 539. If desired, the agitation plate 540 and/or the opposite side wall 520 of the hopper 512 can include teeth portions 543 that extend over the trough 524 and are configured to further breakup the spreading material.

Details of an agitation assembly 552 are shown in FIGS. 15-17. Similar to the above form described with respect to FIGS. 3 and 4, the agitation assembly 552 of this form includes a crank 554 and a connecting linkage 556 that mechanically couples the crank 554 to the agitation plate 540. As shown in FIG. 17, the crank 554 includes a shaft portion 558, an end plate 560, and a drive pin 562 that is radially offset with respect to a longitudinal axis of the shaft portion 558. The crank 554 can be secured to the auger 526, such as with the shaft portion 558 extending co-axially within the central shaft of the auger 526, so that crank 554 rotates with the auger 526 and the drive pin 562 is radially offset from the longitudinal axis L of the auger 526. The connecting linkage 556 of this form includes a drive pin bracket 564 and a rigid connecting arm 566. The drive pin bracket 564 has a through opening 568 sized to receive the drive pin 562 therethrough. A first pin connection 570 pivotably couples the drive pin bracket 564 and the connecting arm 566 together and a second pin connection 572 couples the connecting arm 566 and an agitation plate bracket 573 together. As shown, the agitation plate bracket 573 is provided at an end of the agitation plate 540 adjacent to the agitation assembly 552 and extends upwardly therefrom. In order for the agitation assembly 552 to act on the agitation plate 540 adjacent to the opposite side 551 thereof, the connecting arm 566 can include an upright portion **566*a* extending from the pin connection 570 with the drive pin bracket 564 and a lateral portion 566*b* which extends at an angle with respect to the upright portion 566*a*, such as a right angle as shown, to the second pin connection 572 with the agitation plate bracket 573**.

So configured, as the drive mechanism (not shown) rotates the auger 526, the crank 554 rotates therewith and the drive pin 562 follows an annular rotation path. The connecting linkage 556 is driven in a piston-like manner to thereby oscillate upward and downward. With the pin connection 572 adjacent to the opposite side 551 of the agitation plate 540, the upward and downward oscillations of the connecting linkage 556 causes the agitation plate 540 pivot or flap upward and downward about the pin connections 550 with the offset wall 539.

If desired, the connecting linkage 556 can be disengaged from the drive pin 562 using a release pin 576 that removably couples to the drive pin 562 to hold the drive pin bracket 564 on the drive pin 562. Further, the spreader 510 can include a stationary arm 578 that is pivotably coupled to a fixed structure 580. Accordingly, to disengage the agitation assembly 552, a user can remove the release pin 576, slide the drive pin bracket 564 off the drive pin 562, and connect the drive pin bracket 564 to the stationary arm 578. The release pin 576 can be provided in one of the pin connections 570, 572 and the stationary arm 578 can alternatively couple to the connecting arm 566 or agitation plate bracket 573. With this configuration, tools are not required to change the agitation plate 540 from an agitating mode to standard locked mode.

Figure 18:
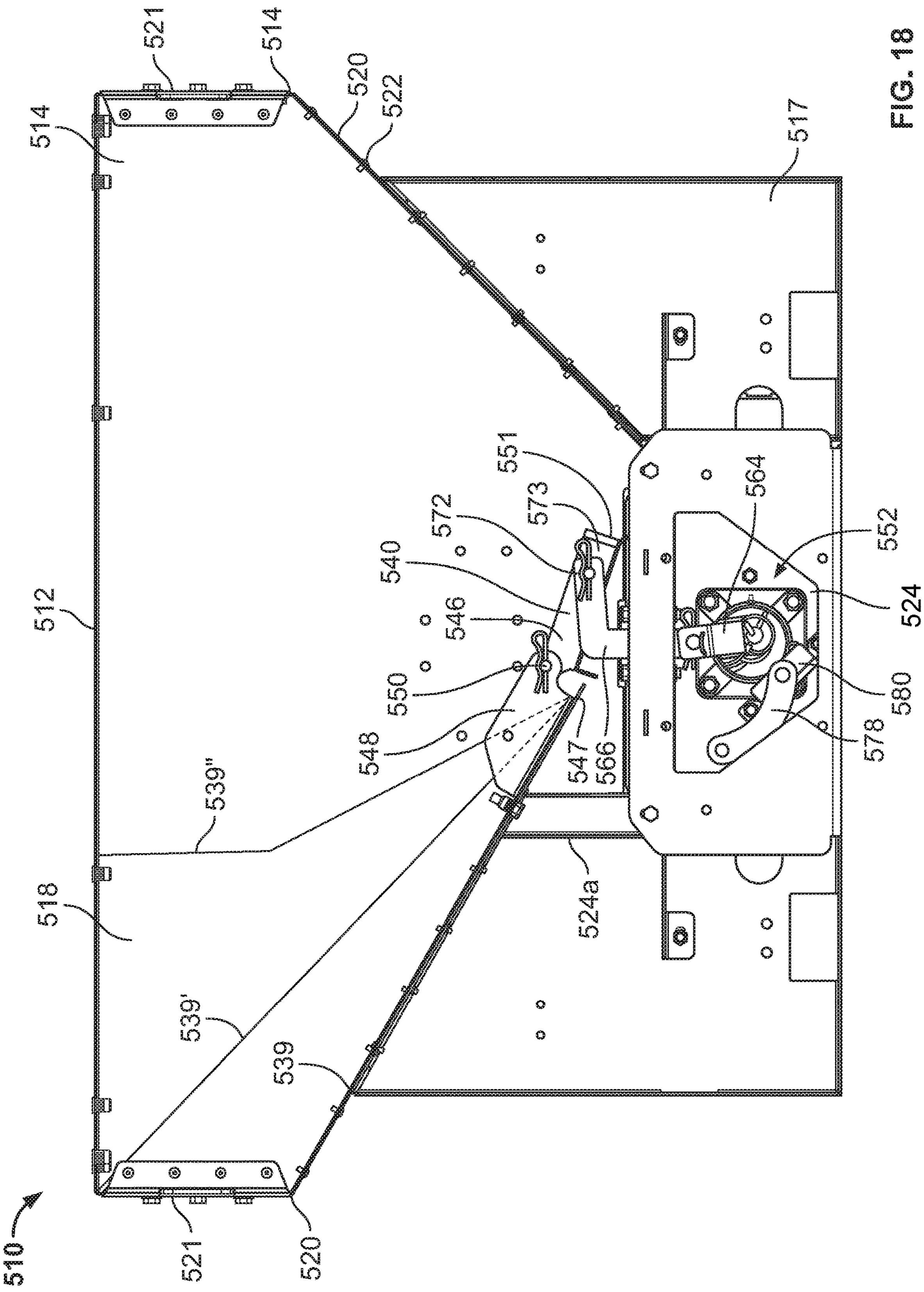
FIG. 18 is a side-cross-sectional view of an alternative embodiment of a spreader having a pivoting agitation assembly in accordance with the present disclosure.

Of course, while the hopper 512 is described above as a retrofit configuration with both the offset wall 539 and the side wall 520 extending beneath the offset wall 539, as shown in FIG. 18, a hopper 512 can alternatively be provided without a separate side wall extending beneath the offset wall 539. Instead, a side 524*a* of the trough 524 can extend upwardly to connect to the offset wall 539 and the offset wall 539 can provide a side wall for the hopper 512.

Figure 19:
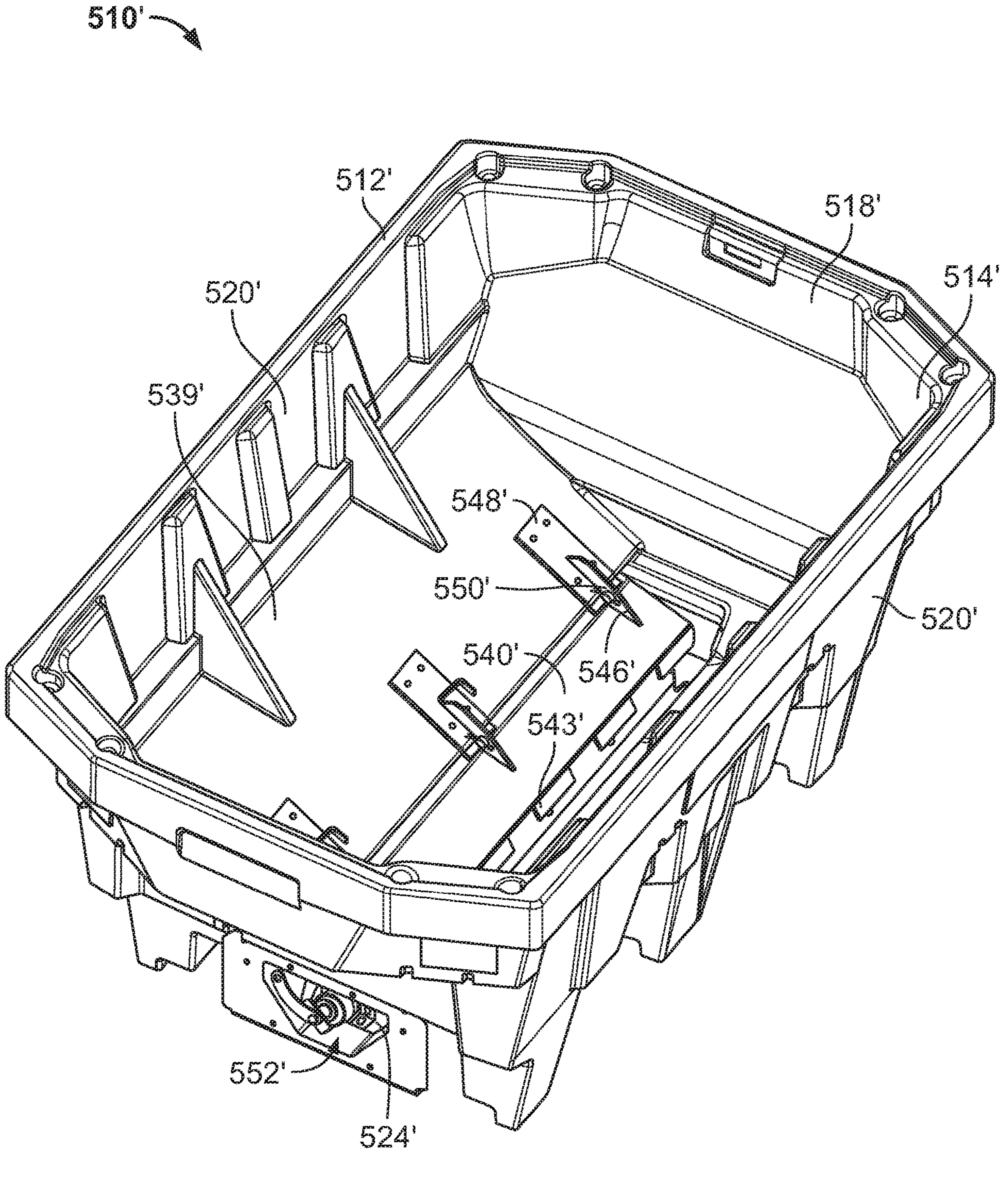
FIG. 19 is a top perspective view of another alternative embodiment of a spreader having a pivoting agitation assembly in accordance with the present disclosure.
Figure 20:
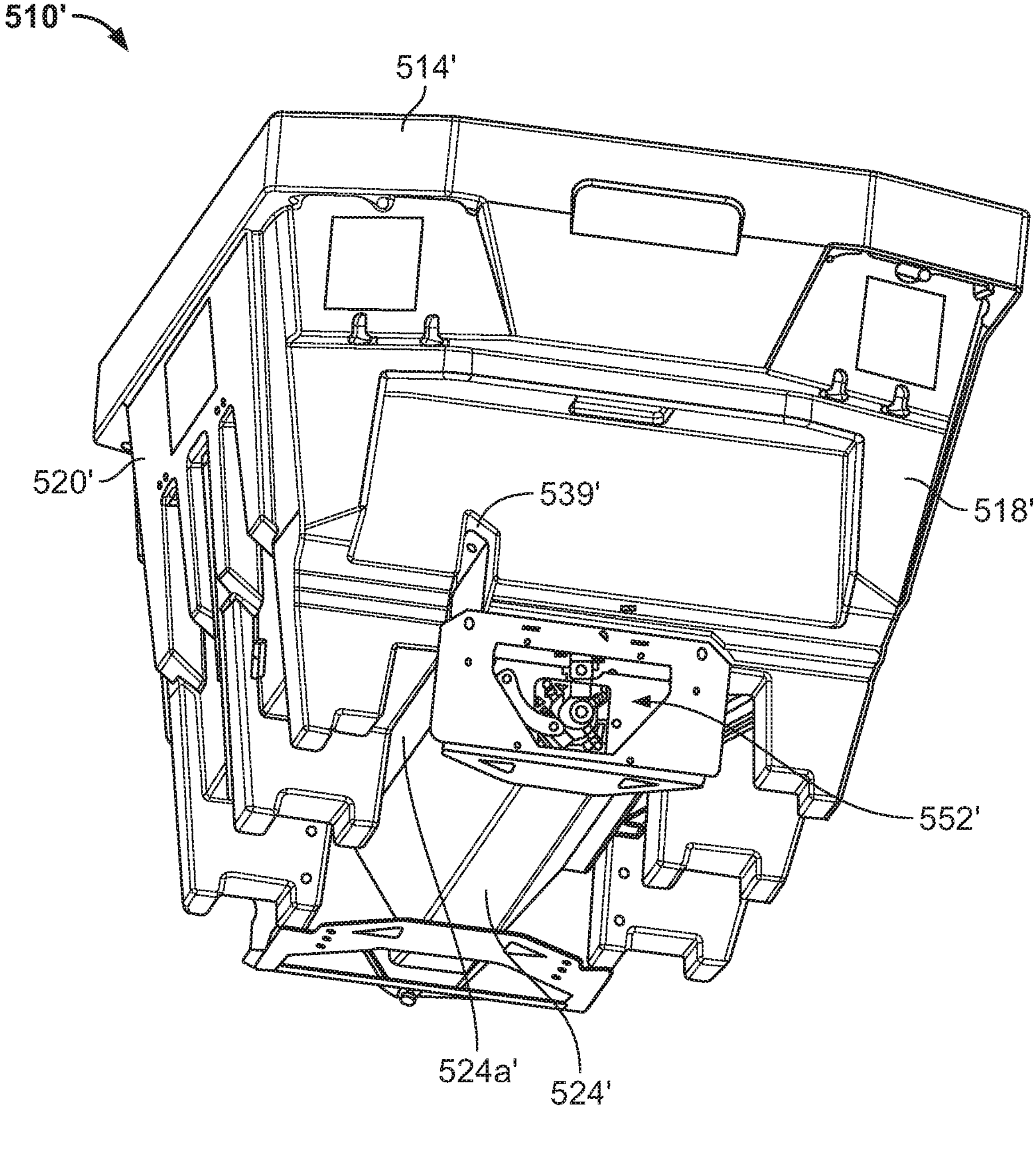
FIG. 20 is a bottom perspective view of the spreader of FIG. 19 in accordance with the present disclosure.
Figure 21:
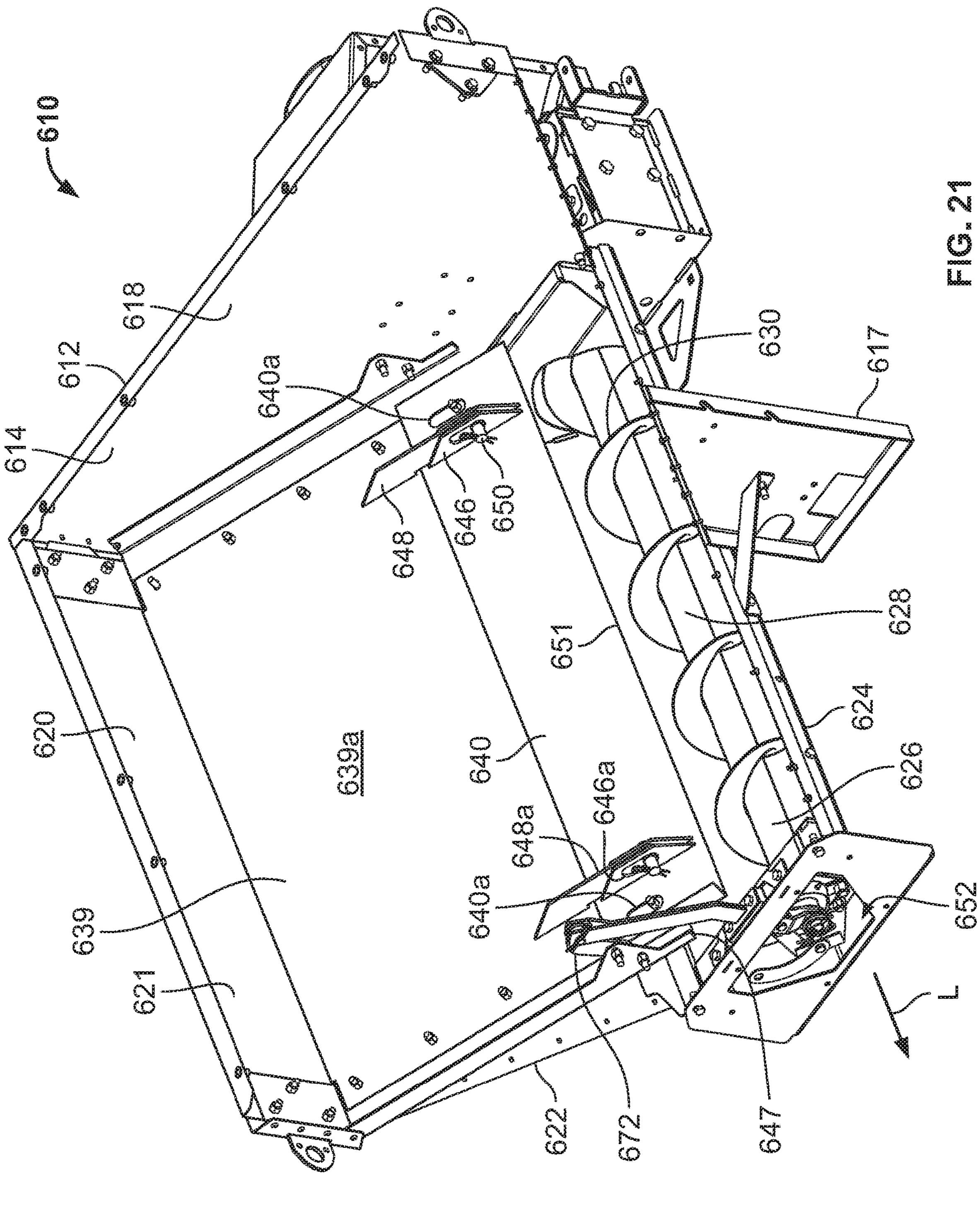
FIG. 21 is a sectional perspective view of another embodiment of a spreader having a sliding agitation assembly in accordance with the present disclosure.

Another alternative spreader 510' is shown in FIGS. 19 and 20 that includes a hopper 512' having a configuration similar to the above form described with respect to FIG. 7. Specifically, the hopper 512' is defined by walls 514', including end walls 518' and side walls 520', and a trough 524'. As shown, one of the side walls 520' can include an offset wall portion 539' pivotably coupled to an agitation plate 540' with a pivotable coupling that includes brackets 546', 548' and a pin connection 550' similar to that described above. The hopper 512' of this form can have a double walled configuration as shown to add strength to the hopper 512' and/or to provide desired structures on the interior and exterior of the hopper 512'. Further, the end and side walls 518', 520' can include ribs and recesses to strengthen the hopper 512' and/or aid in directing flow of the spreading material. As shown in FIG. 20, the trough 524' includes a side 524*a*' that extends upwardly to connect to the offset wall 539'.

A seventh embodiment of a spreader 610 is shown in FIGS. 21-24. The spreader 610 of this form is similar to the above spreader 510 described with reference to FIGS. 15-17 and, for ease of reference, the same or similar components of the spreader 610 will retain the same reference numbers increased by 100. Moreover, description of similar components is omitted for the sake of brevity, but it will be understood that the above description of components applies equally to this embodiment. The spreader 610 of this form includes a hopper 612 having walls 614 and supported by base structure 617. The hopper walls 614 include generally vertical end walls 618, side walls 620 having top vertical portions 621 and lower, inwardly sloped portions 622, and a bottom trough 624. The spreader 610 further includes an auger 626 having a central shaft 628 extending along a longitudinal axis L and a flight 630 wound around the central shaft 628.

Figure 22:
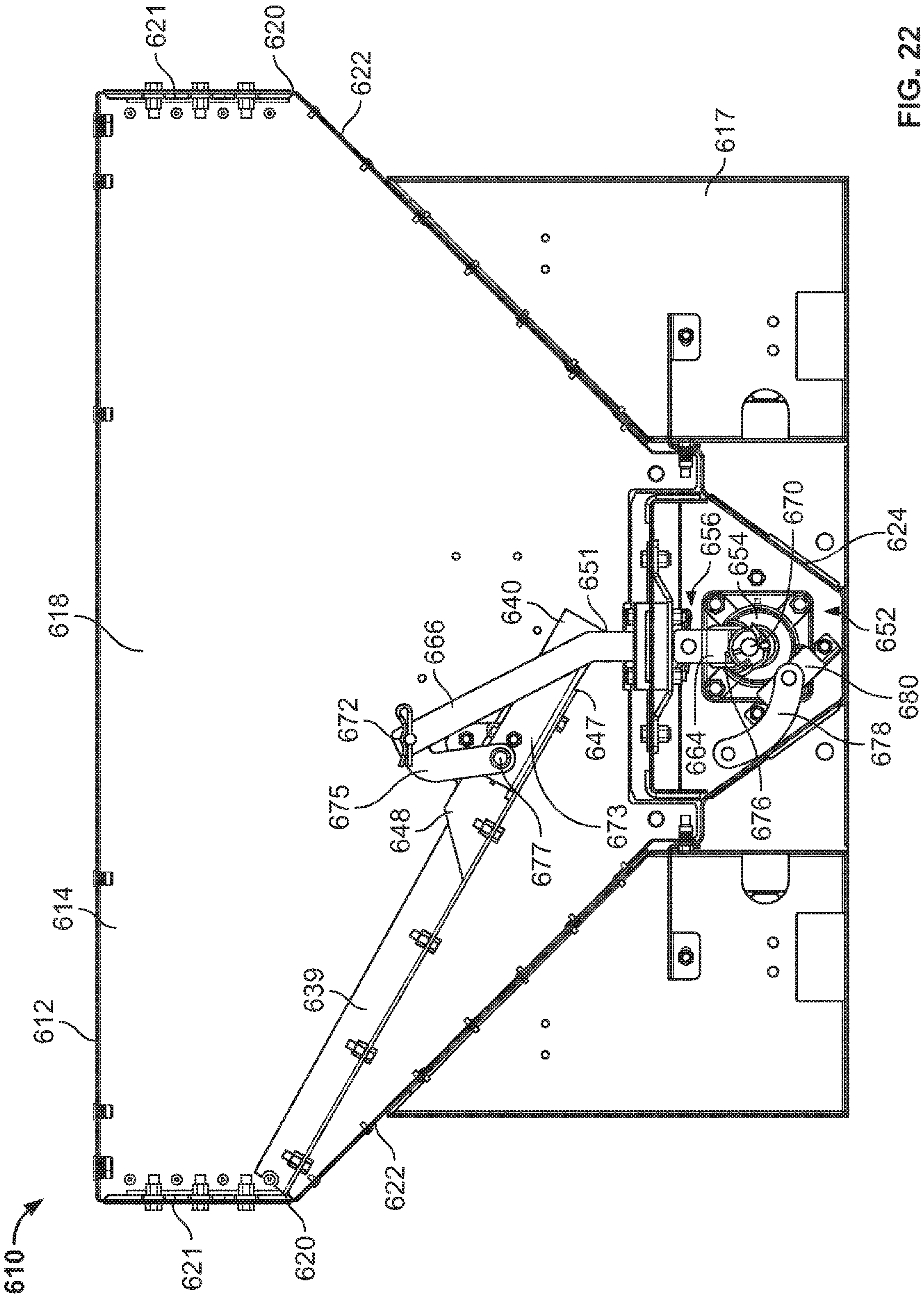
FIG. 22 is a side cross-sectional view of the spreader of FIG. 21 in accordance with the present disclosure.

The spreader 610 of this form includes a retrofit assembly for the hopper 612 that includes an offset wall 639 fixedly coupled the end walls 618 and one of the side walls 620 and an agitation plate 640. An interior edge 647 of the offset wall 639 is aligned over the auger 626 or otherwise over the trough 624. As best shown in FIG. 22, the offset wall 639 extends above the inwardly sloped portion 622 of the one side wall. The offset wall 639 can extend within the hopper 612 at any desired angle. For example, the offset wall 639 can extend at a more gradual angle with respect to the sloped portion 622 of the side wall 620, a steeper angle similar to the forms shown in FIGS. 16 and 18, or at the same angle.

Figure 24:
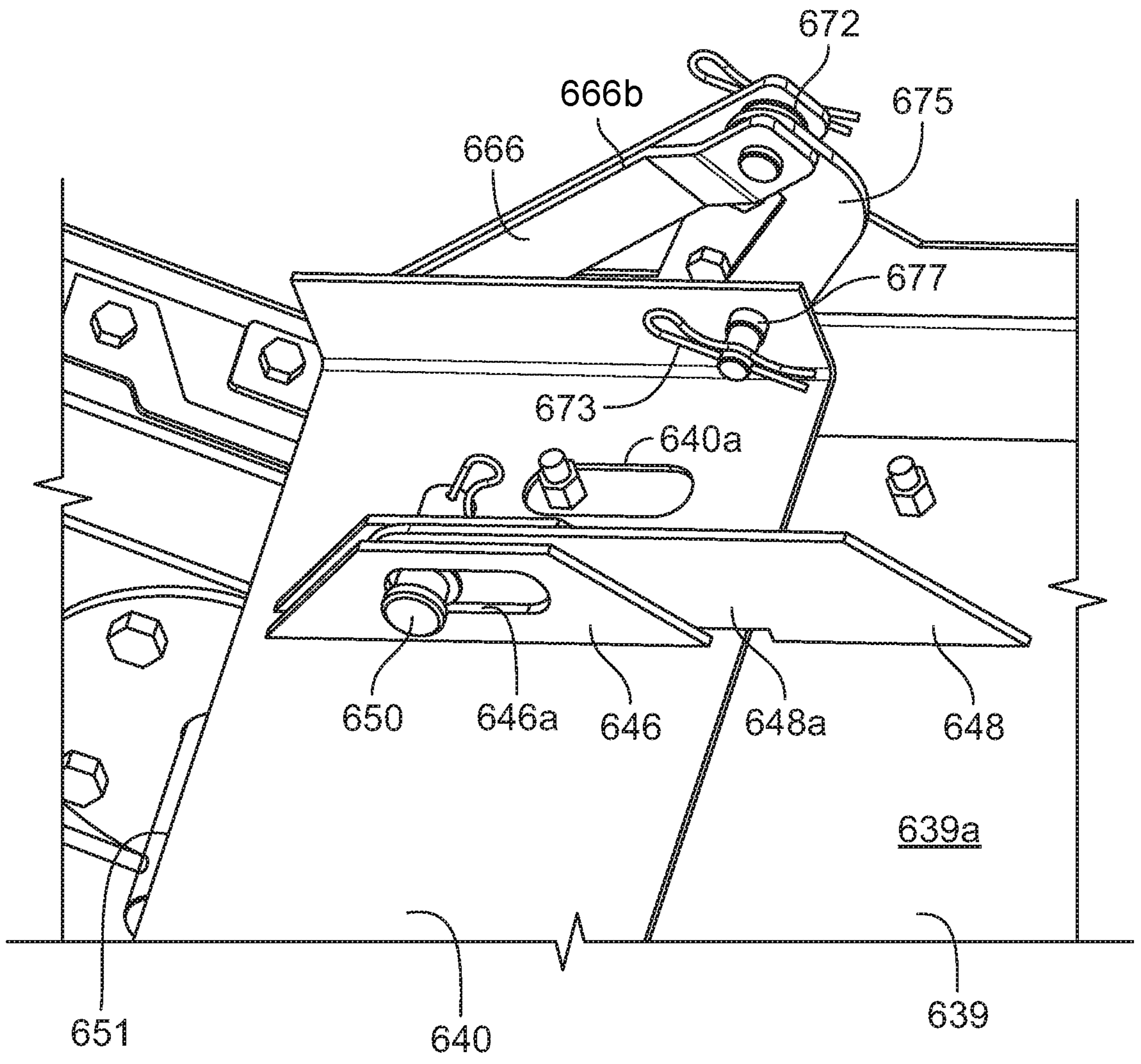
FIG. 24 is a sectional view of components of the sliding agitation assembly for the spreader of FIG. 21 in accordance with the present disclosure.

The agitation plate 640 of this form is slidably coupled to the offset wall 639 adjacent to the interior edge 647 thereof so that the plate 640 extends between, but is spaced from, the hopper end walls 618. The agitation plate 640 and the offset wall 639 include respective brackets 646, 648 that couple together with a pin connection 650. As shown in FIG. 24, the agitation plate bracket 646 includes a slot opening 646*a* that allows the pin connection 650 to slide therein, such that the agitation plate 640 can oscillate over an upper surface 639*a* of the offset wall 639. Further, if desired, the agitation plate bracket 646 can include first and second wall portions extending upwardly on either side of the offset wall bracket 648. The offset wall bracket 648 includes a forwardly projecting toe portion 648*a* that is spaced from the upper surface 639*a* to allow the agitation plate 640 to slide thereunder during use. In one form, the pin connections 650 can be held together with a cotter pin at one end and retention structure at the other end. As shown, the agitation plate 640 and the offset wall 639 can include a plurality of the pin connections 650 therebetween, such as two as shown, three, four or more. The agitation plate 640 can have a width to so that in a fully retracted position, a distal edge 651 of the plate 640 is aligned over the auger 626, such as generally centrally disposed as shown, and in a fully extended position, the distal edge 651 of the plate 640 is aligned over the trough 624 on an opposite side of the auger 626. With this configuration, the spreading material is deposited across an area ranging from over the auger 626 to the side of the auger 626. If desired, although not shown, the agitation plate 640 and/or the opposite side wall 620 of the hopper 612 can include teeth portions that extend over the trough 624 and are configured to further breakup the spreading material. Additionally, the agitation plate 640 can include slot openings 640*a* that allow the agitation plate 640 to slide around fasteners for the offset wall 639.

Figure 23:
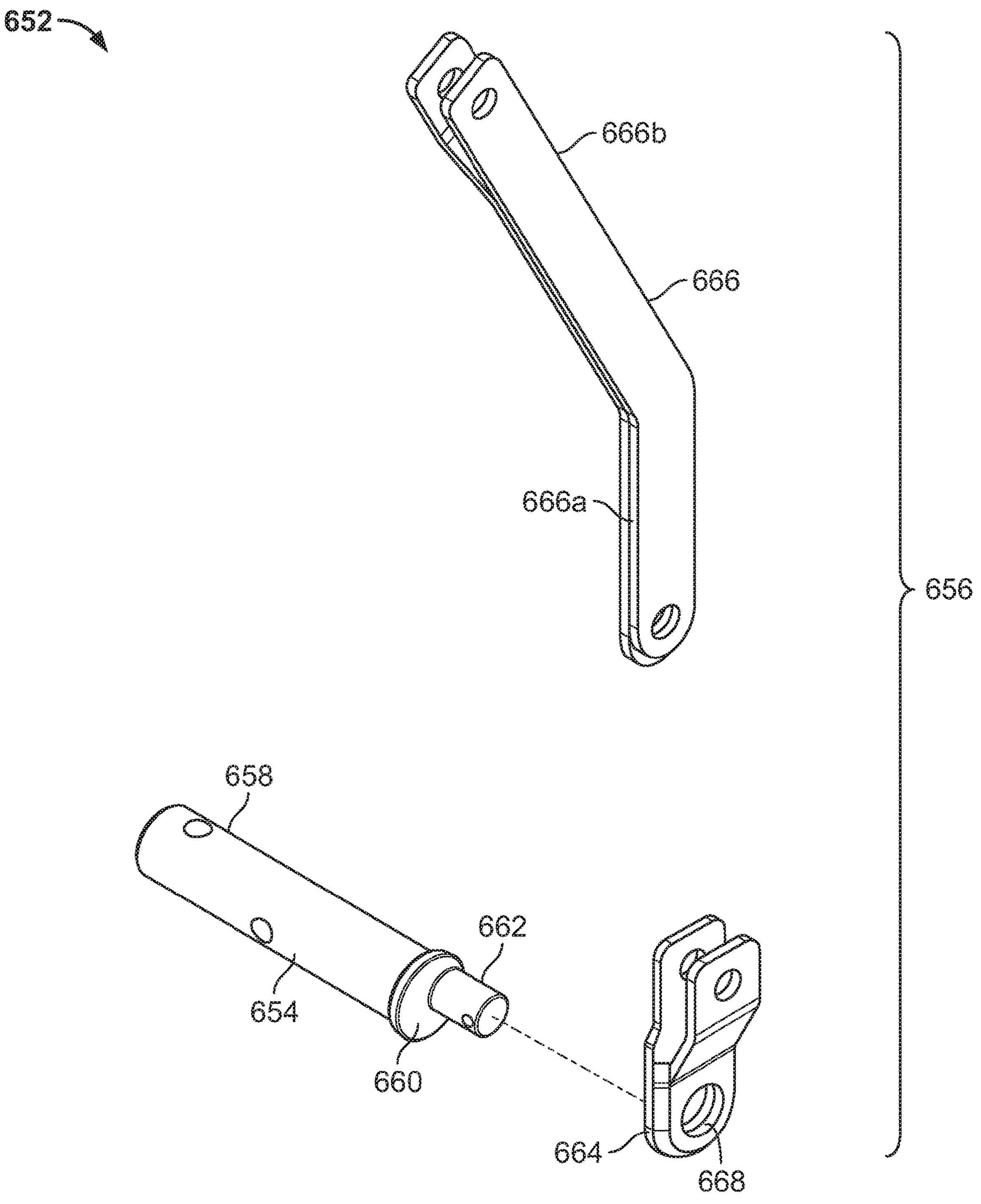
FIG. 23 is an exploded view of components of the sliding agitation assembly for the spreader of FIG. 21 in accordance with the present disclosure.

Details of an agitation assembly 652 are shown in FIGS. 21-24. Similar to the above form described with respect to FIGS. 14-16, the agitation assembly 652 of this form includes a crank 654 and a connecting linkage 656 that mechanically couples the crank 654 to the agitation plate 540. As shown in FIGS. 23 and 24, the crank 654 includes a shaft portion 658, an end plate 660, and a drive pin 662 that is radially offset with respect to a longitudinal axis of the shaft portion 658. The crank 654 can be secured to the auger 626, such as with the shaft portion 658 extending co-axially within the central shaft of the auger 626, so that crank 654 rotates with the auger 626 and the drive pin 662 is radially offset from the longitudinal axis L of the auger 626. The connecting linkage 656 of this form includes a drive pin bracket 664 and a rigid connecting arm 666. The drive pin bracket 664 has a through opening 668 sized to receive the drive pin 662 therethrough. A first pin connection 670 pivotably couples the drive pin bracket 664 and the connecting arm 666 together, a second pin connection 672 pivotably couples the connecting arm 666 to an agitation plate arm 675, and a third pin connection 677 pivotably couples the agitation plate arm 675 to an agitation plate bracket 673. As shown, the agitation plate bracket 673 is provided at an end of the agitation plate 640 adjacent to the agitation assembly 652 and extends upwardly therefrom. In order for the agitation assembly 652 to act on the agitation plate 540 adjacent to an outer side thereof, the connecting arm 666 can include an upright portion 666*a* extending from the pin connection 670 with the drive pin bracket 664 and an angled portion 666*b* which extends at an angle with respect to the upright portion 666*a* to the second pin connection 672 with the agitation plate arm 675. Similar to the agitation plate bracket 646 discussed above, the drive pin bracket 664 can have a forked end with opposing first and second wall portions to receive the connecting arm 666 therebetween for the first pivot connection 670 and the connecting arm 666 can have a forked end with opposing first and second wall portions to receive the agitation plate arm 675 therebetween for the second pivot connections 672. The pivot connections 670, 672, 677 can be held together with a cotter pin at one end and retention structure at the other end.

So configured, as the drive mechanism (not shown) rotates the auger 626, the crank 654 rotates therewith and the drive pin 662 follows an annular rotation path. The connecting linkage 656 is driven in a piston-like manner to thereby oscillate upward and downward. With the linkage 656 and the pin connections 672, 677 therebetween, the upward and downward oscillations of the connecting linkage 656 causes the agitation plate 640 slide up and down over the interior edge 647 of the offset wall 539. Both the brackets 646, 648 with the pin connection 650 therebetween and the overhanging toe portion 648*a* of the offset wall bracket 648 restricting movement of the agitation plate 640 to the desired oscillating, sliding action.

As with the above form, if desired, the connecting linkage 656 can be disengaged from the drive pin 662 using a release pin 676 that removably couples to the drive pin 662 to hold the drive pin bracket 664 on the drive pin 662. Further, the spreader 610 can include a stationary arm 678 that is pivotably coupled to a fixed structure 680 to optionally convert the agitation plate 640 to a fixed position.

Of course, while the hopper 612 is described above as a retrofit configuration with both the offset wall 639 and the side wall 620 extending beneath the offset wall 639, the hopper 612 can alternatively be provided without a separate side wall extending beneath the offset wall 639 similar to that shown in FIG. 18. Alternatively, the sliding agitation assembly can be provided with a hopper having a configuration similar to that shown in FIGS. 19 and 20.

Figure 14:
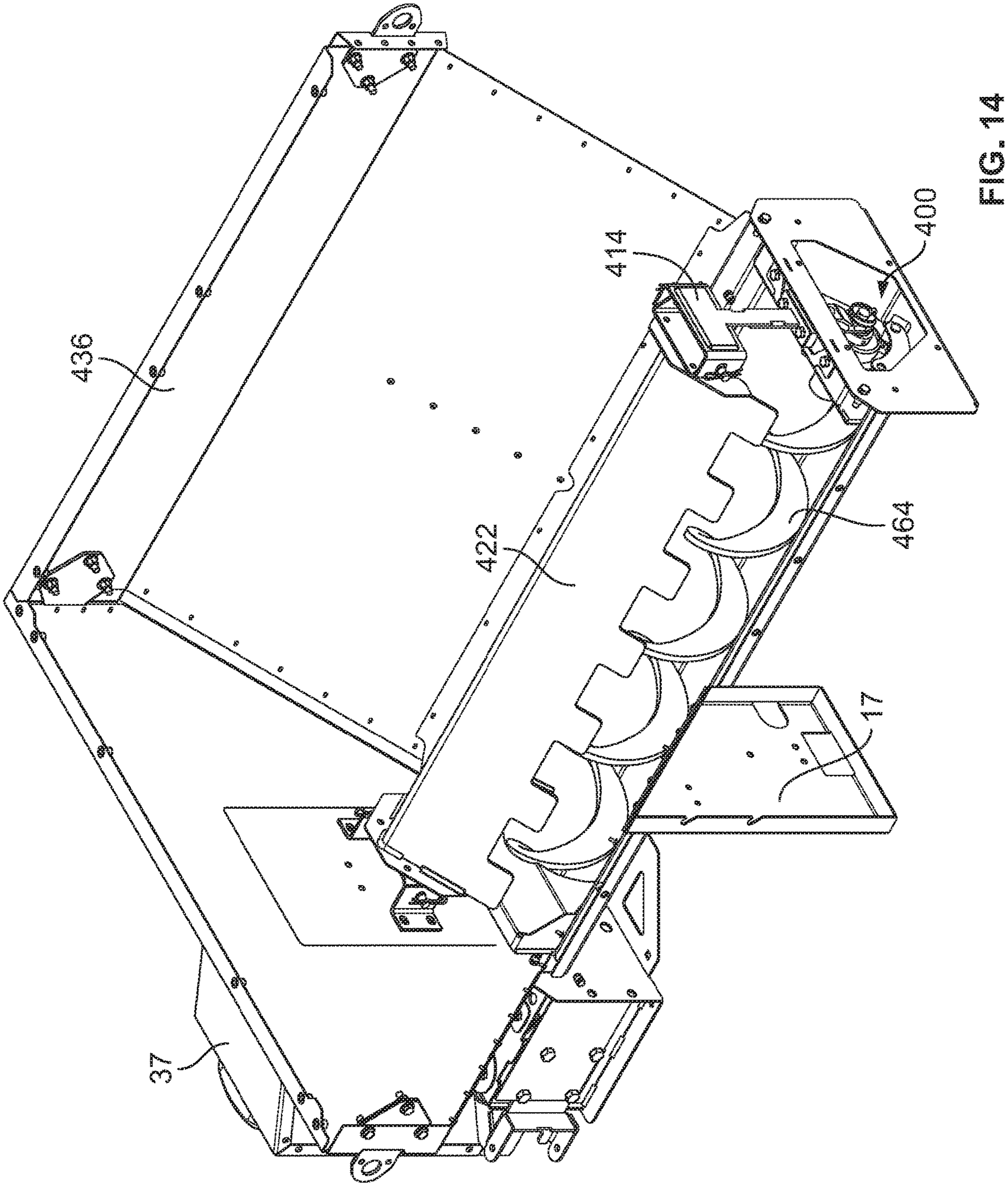
FIG. 14 is a sectional perspective view of another embodiment of a spreader with the agitation assembly of FIG. 12 mounted to a shaftless auger and baffle in accordance with the present disclosure.

In addition to being suitable for installation in any of the above-described hoppers, the spreaders 510, 610 of the above forms can also utilize a shaftless auger 464 as shown in FIG. 14.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. For example, the agitation assemblies described herein can advantageously be retrofit within existing spreaders with suitable modifications to couple a crank to an auger and a connecting linkage to a baffle.

What is claimed is:

1. An agitation assembly for a spreader, the agitation assembly comprising:

a hopper including walls defining an interior;

an auger extending within a portion of the hopper along a longitudinal axis and being rotatable about the longitudinal axis, the auger having a flight to drive a spreadable material;

an agitation plate disposed adjacent to the auger within the hopper;

a crank configured to operably couple to the auger to be rotated therewith about a longitudinal axis of the auger, the crank having a distal end extending longitudinally away from an end of the auger;

a drive pin of the crank disposed at the distal end thereof, the drive pin having a radially offset position with respect to the longitudinal axis;

a housing defining an interior and an opening, at least the distal end of the crank received within the interior of the housing; and a connecting linkage having a first end configured to couple the drive pin of the crank and a second end configured to couple to the agitation plate to oscillate the agitation plate while the auger rotates, the connecting linkage configured to extend through the opening defined in the housing and axially oscillate with respect thereto;

wherein the hopper further includes a trough defining an interior; and further comprising an offset wall extending across a portion of the interior, the offset wall having an interior edge vertically offset from an interior edge of an opposite wall of the hopper; and wherein the agitation plate is movably coupled to the offset wall and has a distal edge aligned over the trough;

wherein the agitation plate has a pivot connection with the offset wall; and the connecting linkage comprises:

an arm; and a bracket coupled to the agitation plate and having a pivot connection with the arm on an opposite side of the agitation plate from the offset wall, such that rotation of the drive pin causes the agitation plate to pivotably oscillate through the connecting linkage.

2. The agitation assembly of claim 1, wherein the crank comprises a shaft configured to extend coaxially with the auger and be mounted to the auger to be rotated thereby.

3. The agitation assembly of claim 1, wherein the agitation plate comprises a baffle disposed adjacent to the auger within the hopper.

4. The agitation assembly of claim 3, wherein the connecting linkage comprises: the bracket coupled to the baffle and having a hinged connection with the arm offset from a longitudinal axis of the baffle, such that rotation of the drive pin causes the baffle to pivotably oscillate through the connecting linkage.

5. The agitation assembly of claim 4, wherein the baffle includes a first end and an opposite, second end, the first and second ends pivotably coupled to the hopper to be rotatable about a longitudinal axis of the baffle.

6. The agitation assembly of claim 3, wherein the baffle comprises first and second wall portions at an angle with respect to one another, each of the first and second wall portions including outwardly projecting teeth.

7. The agitation assembly of claim 1, wherein the auger further includes a shaft disposed along the longitudinal axis, the flight extending outwardly from the shaft.

8. The agitation assembly of claim 1, wherein the offset wall comprises one of the side walls.

9. The agitation assembly of claim 1, wherein the connecting linkage further comprises a release mechanism to uncouple the connecting linkage from the drive pin of the crank.

10. The agitation assembly of claim 1, further comprising a drive mechanism operably coupled to the auger to drive rotation thereof.

11. An agitation assembly for a spreader, the agitation assembly comprising:

a hopper including walls defining an interior;

an auger extending within a portion of the hopper along a longitudinal axis and being rotatable about the longitudinal axis, the auger having a flight to drive a spreadable material;

an agitation plate disposed adjacent to the auger within the hopper;

a crank configured to operably couple to the auger to be rotated therewith about a longitudinal axis of the auger, the crank having a distal end extending longitudinally away from an end of the auger;

a drive pin of the crank disposed at the distal end thereof, the drive pin having a radially offset position with respect to the longitudinal axis;

a housing defining an interior and an opening, at least the distal end of the crank received within the interior of the housing; and a connecting linkage having a first end configured to couple the drive pin of the crank and a second end configured to couple to the agitation plate to oscillate the agitation plate while the auger rotates, the connecting linkage configured to extend through the opening defined in the housing and axially oscillate with respect thereto;

wherein the agitation plate comprises a baffle disposed adjacent to the auger within the hopper:

wherein the connecting linkage comprises:

an arm; and a bracket coupled to the baffle and having a hinged connection with the arm offset from a longitudinal axis of the baffle, such that rotation of the drive pin causes the baffle to pivotably oscillate through the connecting linkage;

wherein the baffle includes a first end and an opposite, second end, the first and second ends pivotably coupled to the hopper to be rotatable about a longitudinal axis of the baffle;

wherein the baffle comprises separated first and second portions, the separated first and second portions pivotably coupled together about a pin connection extending through a brace coupled to the hopper.

12. An agitation assembly for a spreader, the agitation assembly comprising:

a hopper including walls defining an interior;

an auger extending within a portion of the hopper along a longitudinal axis and being rotatable about the longitudinal axis, the auger having a flight to drive a spreadable material;

an agitation plate disposed adjacent to the auger within the hopper;

a crank configured to operably couple to the auger to be rotated therewith about a longitudinal axis of the auger, the crank having a distal end extending longitudinally away from an end of the auger;

a drive pin of the crank disposed at the distal end thereof, the drive pin having a radially offset position with respect to the longitudinal axis;

a housing defining an interior and an opening, at least the distal end of the crank received within the interior of the housing; and a connecting linkage having a first end configured to couple the drive pin of the crank and a second end configured to couple to the agitation plate to oscillate the agitation plate while the auger rotates, the connecting linkage configured to extend through the opening defined in the housing and axially oscillate with respect thereto;

wherein the agitation plate comprises a baffle disposed adjacent to the auger within the hopper;

wherein the connecting linkage comprises a member coupled to the baffle in a pivotably restricted configuration such that rotation of the drive pin causes the baffle to vertically oscillate;

wherein the baffle includes a first end pivotably coupled to the hopper about a rotation axis generally perpendicular to a longitudinal axis of the baffle and an opposite, second end coupled to the member.

13. An agitation assembly for a spreader, the agitation assembly comprising:

a hopper including walls defining an interior;

an auger extending within a portion of the hopper along a longitudinal axis and being rotatable about the longitudinal axis, the auger having a flight to drive a spreadable material;

an agitation plate disposed adjacent to the auger within the hopper;

a crank configured to operably couple to the auger to be rotated therewith about a longitudinal axis of the auger;

a drive pin of the crank having a radially offset position with respect to the longitudinal axis; and a connecting linkage configured to couple the drive pin of the crank to the agitation plate to oscillate the agitation plate while the auger rotates;

wherein the agitation plate has a sliding connection with a wall of the hopper with a main face of the agitation plate being generally parallel with the wall of the hopper, such that rotation of the drive pin causes the agitation plate to slidably oscillate over a portion of the wall through the connecting linkage;

wherein the connecting linkage comprises:

first and second arms pivotably coupled together; and a bracket coupled to the agitation plate and having a pivotable connection with the second arm.

14. The agitation assembly of claim 13, wherein the sliding connection between the agitation plate and the wall comprises brackets of the agitation plate and the wall couple by a pin extending therebetween, the bracket of the agitation plate having a slot opening allowing the pin to shift therein for the agitation plate to slidably oscillate over a portion of the wall.

15. An agitation assembly for a spreader, the agitation assembly comprising:

a hopper including walls defining an interior;

an auger extending within a portion of the hopper along a longitudinal axis and being rotatable about the longitudinal axis, the auger having a flight to drive a spreadable material;

an agitation plate disposed adjacent to the auger within the hopper;

a crank configured to operably couple to the auger to be rotated therewith about a longitudinal axis of the auger, the crank having a distal end extending longitudinally away from an end of the auger;

a drive pin of the crank disposed at the distal end thereof, the drive pin having a radially offset position with respect to the longitudinal axis;

a housing defining an interior and an opening, at least the distal end of the crank received within the interior of the housing;

a connecting linkage having a first end configured to couple the drive pin of the crank and a second end configured to couple to the agitation plate to oscillate the agitation plate while the auger rotates, the connecting linkage configured to extend through the opening defined in the housing and axially oscillate with respect thereto, wherein the connecting linkage further comprises a release mechanism to uncouple the connecting linkage from the drive pin of the crank; and a stationary arm configured to couple to the connecting linkage after the connecting linkage is uncoupled from the drive pin of the crank to provide a fixed connection for the connecting linkage to thereby lock the agitation plate in a fixed state.

* * * * *